US012698156B2

(12) United States Patent
Clark et al.

(10) Patent No.: US 12,698,156 B2
(45) Date of Patent: Aug. 4, 2026

(54) SYSTEM AND METHOD FOR MATERIAL STORAGE AND TRANSPORTATION

(71) Applicant: Mytra, Inc., South San Francisco, CA (US)

(72) Inventors: Matt Clark, San Francisco, CA (US); Christopher Walti, San Francisco, CA (US); Jared Parker, San Francisco, CA (US)

(73) Assignee: Mytra, Inc., Brisbane, CA (US)

( * ) Notice: Subject to any disclaimer, the term of this patent is extended or adjusted under 35 U.S.C. 154(b) by 0 days.

(21) Appl. No.: 19/205,835

(22) Filed: May 12, 2025

(65) Prior Publication Data

US 2025/0346427 A1 Nov. 13, 2025

Related U.S. Application Data

(60) Provisional application No. 63/645,601, filed on May 10, 2024.

(51) Int. Cl.
B65G 1/06 (2006.01)

(52) U.S. Cl.
CPC .................................... B65G 1/065 (2013.01)

(58) Field of Classification Search
CPC ..................................................... B65G 1/065
See application file for complete search history.

(56) References Cited

U.S. PATENT DOCUMENTS

| | | |
|---|---|---|
| 3,766,788 A | 10/1973 | Metz |
| 4,285,249 A | 8/1981 | Kume |

| | | | |
|---|---|---|---|
| 4,541,297 A | 9/1985 | Fujita | |
| 5,592,852 A | 1/1997 | Parsons | |
| 5,960,668 A | 10/1999 | Tseng et al. | |
| 6,257,426 B1 * | 7/2001 | Masunaka ............ | A47B 57/545 |
| | | | 211/187 |
| 6,598,708 B2 | 7/2003 | St-germain et al. | |
| 7,381,022 B1 | 6/2008 | King | |
| 8,721,251 B1 | 5/2014 | Razumov | |
| 9,856,111 B1 * | 1/2018 | Anderson ........... | B66B 11/0407 |
| 10,364,099 B1 * | 7/2019 | Brazeau ................... | B65G 1/06 |
| 10,399,772 B1 * | 9/2019 | Brazeau ............... | B65G 1/0492 |

(Continued)

FOREIGN PATENT DOCUMENTS

| | | |
|---|---|---|
| CN | 109099128 A | 12/2018 |
| DE | 3712087 A1 | 10/1987 |

(Continued)

OTHER PUBLICATIONS

Herrero, et al., "Method and System for Control of a Vertically Translatable Robot", U.S. Appl. No. 19/046,366, filed Feb. 5, 2025.

(Continued)

*Primary Examiner* — Saul Rodriguez
*Assistant Examiner* — Ashley K Romano
(74) *Attorney, Agent, or Firm* — Jeffrey Schox; Evan Myers

(57) ABSTRACT

A system 100 for automated storage and retrieval of materials can include a storage grid 200, and can include and/or interface with one or more material handling robots 600, and/or any other suitable components. A storage grid 200 can include a set of one or more: cells 300, columns 400, beams 500, and/or any other suitable components.

4 Claims, 19 Drawing Sheets

Storage grid 200

(56) References Cited

U.S. PATENT DOCUMENTS

| | | | | |
|---|---|---|---|---|
| 10,435,241 | B2 | 10/2019 | Lert et al. | |
| 10,442,621 | B2 | 10/2019 | Bestic et al. | |
| 11,554,917 | B2 | 1/2023 | Stevens et al. | |
| 12,227,363 | B2 | 2/2025 | Mahriche | |
| 12,338,072 | B1 * | 6/2025 | Walti | B65G 1/0471 |
| 12,345,312 | B2 | 7/2025 | Ozog et al. | |
| 2003/0200706 | A1 * | 10/2003 | Kahan | E04H 9/0237 |
| | | | | 52/167.3 |
| 2003/0206789 | A1 * | 11/2003 | Tai | B65G 1/0414 |
| | | | | 414/275 |
| 2007/0065258 | A1 * | 3/2007 | Benedict | B65G 1/04 |
| | | | | 414/266 |
| 2008/0277243 | A1 | 11/2008 | Hayduchok et al. | |
| 2010/0058675 | A1 * | 3/2010 | Simmons | E04B 1/34807 |
| | | | | 52/745.13 |
| 2011/0047889 | A1 * | 3/2011 | Gad | E04H 1/005 |
| | | | | 52/650.1 |
| 2014/0182977 | A1 | 7/2014 | Chen | |
| 2014/0202968 | A1 * | 7/2014 | Kirby | A47B 57/485 |
| | | | | 211/49.1 |
| 2014/0267703 | A1 * | 9/2014 | Taylor | G05D 1/0274 |
| | | | | 348/139 |
| 2014/0290154 | A1 * | 10/2014 | Perko | E04H 9/145 |
| | | | | 52/126.5 |
| 2015/0127143 | A1 | 5/2015 | Lindbo et al. | |
| 2015/0178673 | A1 | 6/2015 | Penneman | |
| 2015/0197397 | A1 * | 7/2015 | Razumov | B65G 1/0492 |
| | | | | 414/807 |
| 2015/0225187 | A1 * | 8/2015 | Razumov | B65G 1/0492 |
| | | | | 414/807 |
| 2017/0121110 | A1 | 5/2017 | Zombori | |
| 2018/0148259 | A1 * | 5/2018 | Gravelle | B65G 1/04 |
| 2018/0244467 | A1 | 8/2018 | Hognaland | |
| 2018/0305122 | A1 | 10/2018 | Moulin et al. | |
| 2019/0023492 | A1 * | 1/2019 | Voloskov | B65G 1/0492 |
| 2019/0040623 | A1 * | 2/2019 | Miller | E04F 13/0855 |
| 2019/0359423 | A1 | 11/2019 | Lee et al. | |
| 2019/0375589 | A1 | 12/2019 | Gravelle et al. | |
| 2019/0389673 | A1 * | 12/2019 | Shirouzu | B62D 57/04 |
| 2020/0048892 | A1 * | 2/2020 | Cecchetto, Jr. | E04B 1/08 |
| 2020/0087065 | A1 | 3/2020 | Gravelle et al. | |
| 2020/0231384 | A1 | 7/2020 | Lisso | |
| 2021/0131093 | A1 * | 5/2021 | Del Rio | E04B 1/5831 |
| 2021/0347569 | A1 | 11/2021 | Dayrell | |
| 2022/0002077 | A1 * | 1/2022 | Austrheim | B65G 1/0464 |
| 2022/0071389 | A1 * | 3/2022 | Globerman | A47B 47/027 |
| 2022/0281118 | A1 | 9/2022 | Pavani | |
| 2022/0281684 | A1 | 9/2022 | Fjeldheim et al. | |
| 2023/0104556 | A1 * | 4/2023 | Bowron | B66C 13/08 |
| | | | | 52/125.6 |
| 2023/0159272 | A1 | 5/2023 | Cannon | |
| 2024/0025645 | A1 | 1/2024 | Moulin et al. | |
| 2024/0140714 | A1 | 5/2024 | Walti et al. | |
| 2024/0383084 | A1 * | 11/2024 | Otani | B23Q 1/626 |
| 2025/0236461 | A1 * | 7/2025 | Perry-Eaton | B65G 65/00 |

FOREIGN PATENT DOCUMENTS

| | | | |
|---|---|---|---|
| DE | 102005006475 | B3 | 5/2006 |
| GB | 2059540 | A | 4/1981 |
| WO | 2012123335 | A1 | 9/2012 |
| WO | 2022109452 | A2 | 5/2022 |
| WO | 2022207574 | A1 | 10/2022 |

OTHER PUBLICATIONS

Thable, et al., "System and Method for Multi-Rack Storage", U.S. Appl. No. 19/236,841, filed Jun. 12, 2025.

Walti, et al., "System and/or Method for Dynamic Rebalancing of Multi-Rack Storage", U.S. Appl. No. 18/964,303, filed Nov. 29, 2024.

* cited by examiner

200

600

Storage grid 200

Example column
cross section

Column

Base
plate

Fastener

Node
plate

Ribs

Rolled hem

Columnar reaction forces occur at this node plate joint group

Columnar reaction forces occur at this node plate joint group

Applied force on beam

First node plate joint group

Columnar reaction forces occur at perpendicular node plate joint group

Second node plate joint group

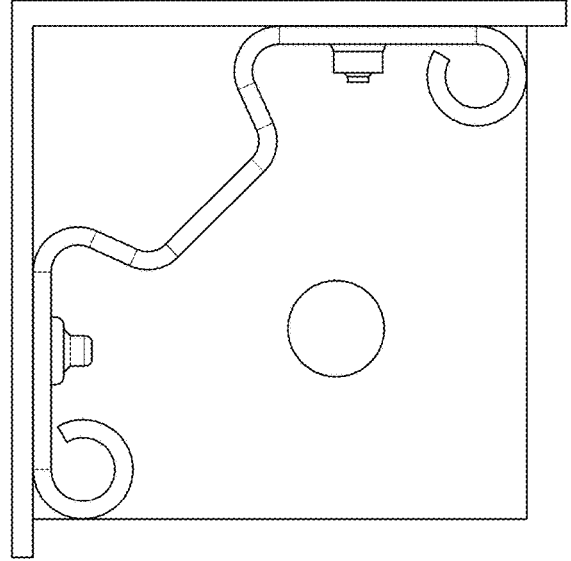
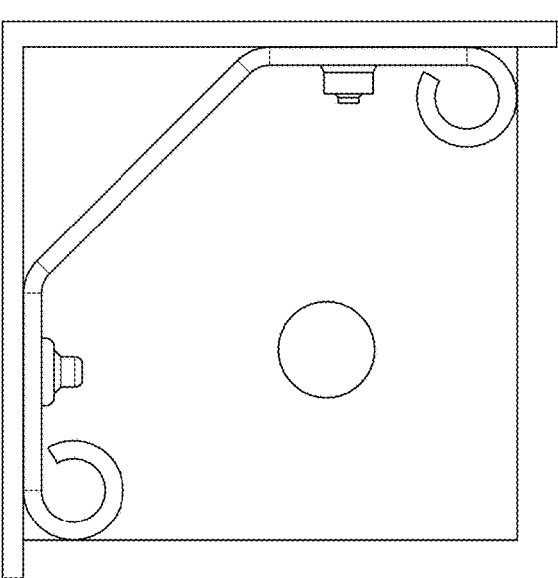
FIGURE 6A                    FIGURE 6B

Spacer plate

Node plate

Spacer plate

Spacer plate

Spacer plate

Node plate

Beam

Load
transfer
plate
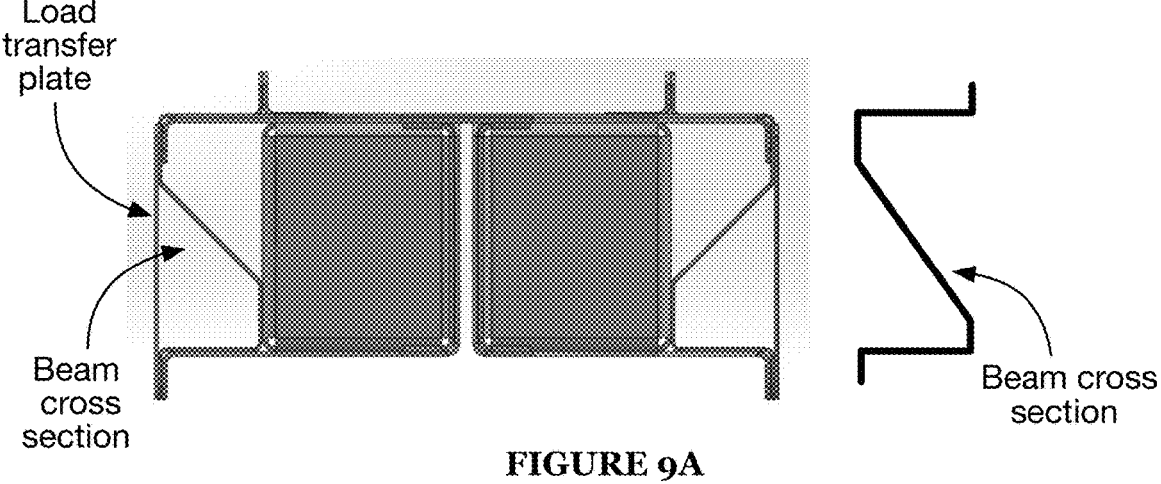
Beam
cross
section
Beam cross
section
FIGURE 9A
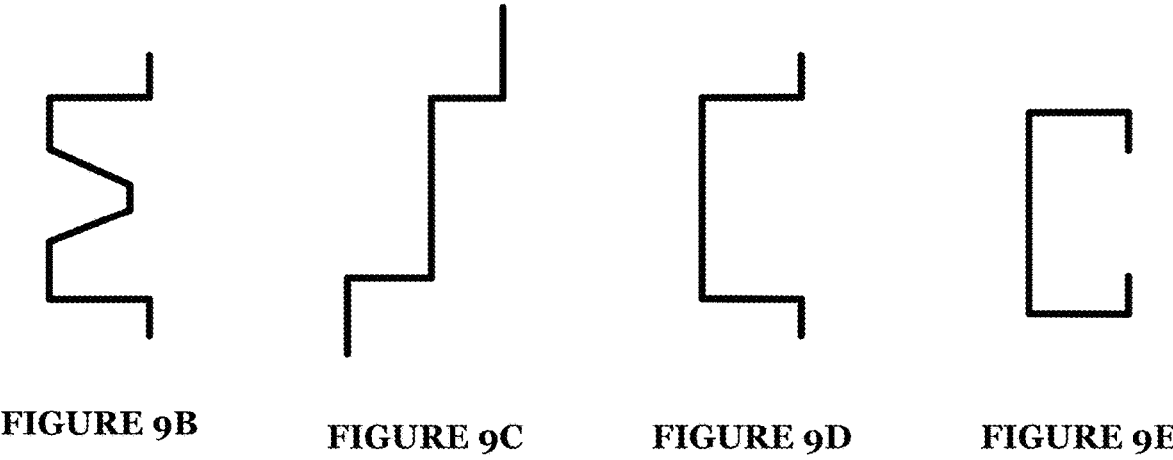
FIGURE 9B        FIGURE 9C        FIGURE 9D        FIGURE 9E

Node plate with
spacer at beam

Node plate

Spacer plate

Spacer plate helical drive

Central axis of rotation

Helical rack

Helical rack helical racks column 400 beam 500 beam 300 helical rack column 400

SYSTEM AND METHOD FOR MATERIAL STORAGE AND TRANSPORTATION

CROSS-REFERENCE TO RELATED APPLICATIONS

This application claims the benefit of U.S. Provisional Application No. 63/645,601, filed 10 May 2024, which is incorporated in its entirety by this reference.

This application is related to U.S. application Ser. No. 18/493,278, filed 24 Oct. 2023, U.S. application Ser. No. 18/531,184, filed 6 Dec. 2023, and U.S. application Ser. No. 19/046,366, filed 5 Feb. 2025, each of which is incorporated in its entirety by this reference.

TECHNICAL FIELD

This invention relates generally to the industrial robotics field, and more specifically to a new and useful system and method for automated storage and retrieval of materials in the industrial robotics field.

BRIEF DESCRIPTION OF THE FIGURES

FIGS. 6A and 6B are illustrative representations of variants of a single column section cross section.

FIGS. 9A-9E are illustrative representations of variants of a beam cross section.

BACKGROUND

An automated storage and retrieval system (AS/RS) is a material storage system designed for automated storage and retrieval of parts or items in manufacturing, distribution, retail, and wholesale facilities. AS/RS system generally includes one or more automated storage and retrieval machines (such as guided vehicles, shuttles, robots, conveyors, elevators, and/or lifts) operating under computerized control that directs the machine to a location where parts or items loaded on a pallet are to be stored and/or picked up. For example, to store an item(s), a pallet or tray loaded with the item can be placed at an input station, and the information for the item is entered into a computer terminal to determine a suitable location for the item. The automated storage and retrieval machine then automatically moves the pallet or tray to the determined location and stores the load (with the pallet or tray). Later retrieval of the item can be then accomplished by specifying the location, where the same or different automated storage and retrieval machine can automatically navigate to and move the pallet or tray with the load.

With the advancement of automation technology, existing AS/RS systems have been able to configure a warehouse management system with strategies and processes that can automate different aspects of warehouse operation, including item stocking and retrieval. However, such systems are limited by the movement constraints imposed by the construction of conventional warehouse frame structures (e.g., limited to 2D movement or 2.5D movement; constrained by frame diagonalization).

Therefore, there is a need for an improved technology that can enable more complex AS/RS movements to improve the performance of warehouse operations.

DETAILED DESCRIPTION

The following description of the embodiments of the invention is not intended to limit the invention to these embodiments, but rather to enable any person skilled in the art to make and use this invention.

1. Overview.

Figure 1:
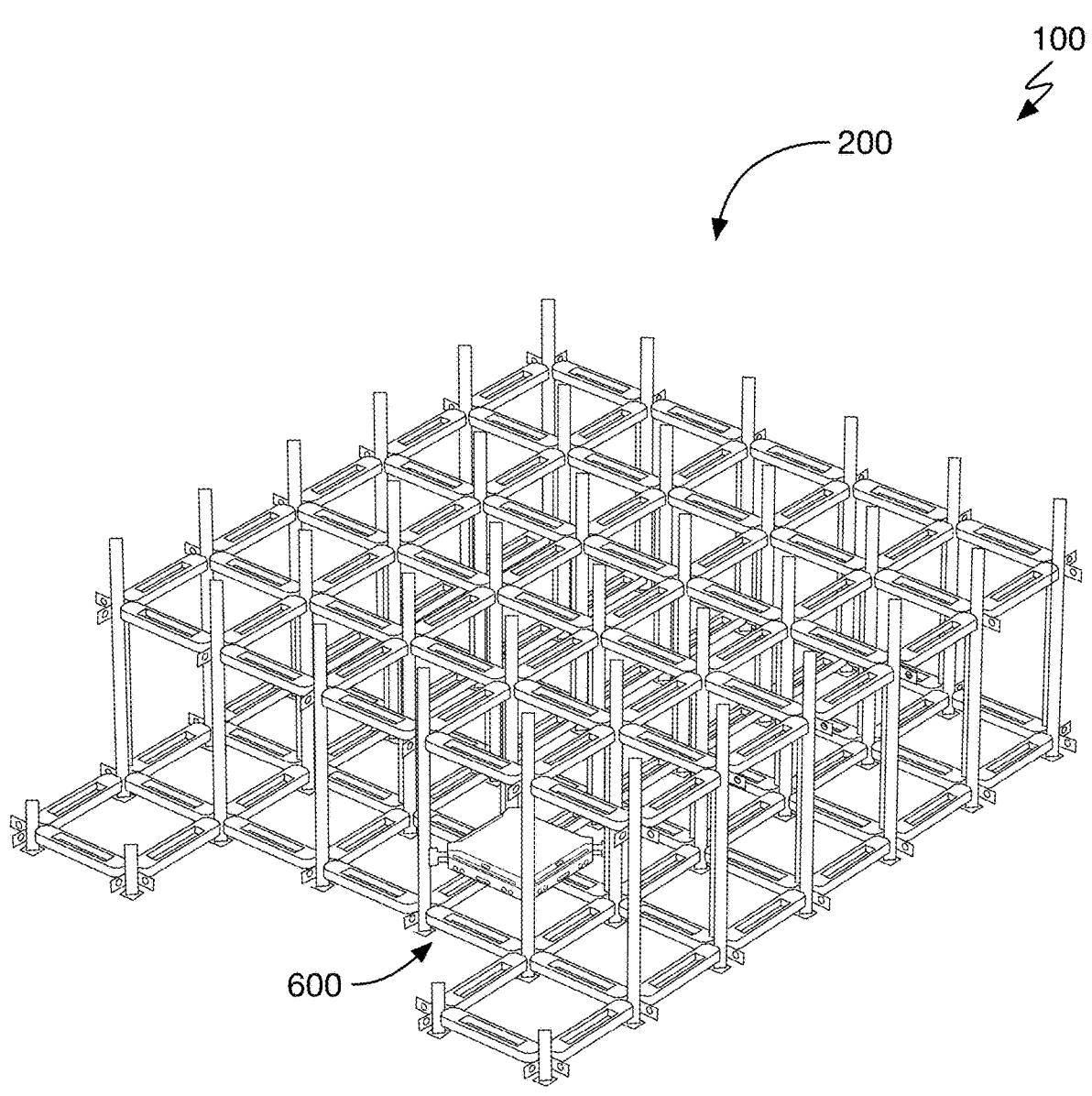
FIG. 1 is an illustrative representation of a variant of system.

As shown in FIG. 1, the system 100 for automated storage and retrieval of materials can include a storage grid 200, and can include and/or interface with one or more material handling robots 600, and/or any other suitable components. A storage grid 200 can include a set of one or more: cells 300, columns 400, beams 500, and/or any other suitable components.

In an illustrative example, the storage grid can be a moment frame made up of a plurality of interconnecting, modular cells (e.g., identical cells). Each of the cells can be a cuboid defined by columns (at each of four vertical edges of the cell). Each of the columns can connect to adjacent columns via a beam assembly. Each of the columns can include four symmetric parallel column sections, joined together to form the column. The beam assembly can include two parallel beam components, which can optionally function as the tracks for a set of material handling robots. The set of material handling robots can navigate laterally through the storage grid by travelling between two columns along the tracks defined by two opposite parallel beams within a cell (e.g., without navigating around columns). The set of material handling robots can navigate vertically through the storage grid by a column mounting mechanism (e.g., helical roller).

However, the system can be otherwise composed and/or can include any other suitable components.

A method for automated storage and retrieval of materials can include: optionally assembling a storage grid, deploying a fleet of material handling robots (e.g., a fleet of one or more robots), loading a fleet of material handling robots with a set of materials (e.g., packages, pallets, etc.), navigating a fleet of material handling robots throughout the storage grid, retrieving a material handling robot, and/or any other suitable steps.

Additionally or alternatively, the system 100 can include and/or interface with any or all of the components as described in: U.S. application Ser. No. 18/493,278, filed 24 Oct. 2023, and/or U.S. application Ser. No. 18/531,184, filed 6 Dec. 2023, each of which is incorporated in its entirety by this reference. Additionally or alternatively, the method can include any or all of the processes described in U.S. application Ser. No. 18/493,278, filed 24 Oct. 2023, and/or U.S. application Ser. No. 18/531,184, filed 6 Dec. 2023, each of which is incorporated in its entirety by this reference, or any other suitable processes performed in any suitable order. The method 200 can be performed with a system as described above and/or any other suitable system.

1.1 Variants

In a first set of variants, storage grid system for automated storage and retrieval comprising: a moment frame comprising a plurality of columns and a plurality of beams, joined in a rectilinear grid which defines a plurality of storage cells, wherein the plurality of storage cells comprises a set of interior storage cells, wherein each interior storage cell of the set defines six faces, each face bounded by an adjacent storage cell of the plurality.

In a first variant, the plurality of storage cells further defines a set of peripheral storage cells, the system further comprising a set of braces which reinforce columns along the diagonals of the exterior faces of a set of peripheral storage cells.

In a second variant, nonexclusive from the first, the set of interior storage cells defines a portal frame structure within the moment frame (e.g., without diagonals across the faces of the interior storage cells; without cross-bracing).

In a third variant, nonexclusive from the first or second, each interior storage cell defines a six-way shuttle cell. For example, an AS/RS robot can be configured to shuttle a payload through each of the six faces of the interior storage cell.

In a third variant, nonexclusive from the first, second, or third, a first column of the plurality of columns is joined with a first, second, and third beam, a reference plane intersecting the first, second, and third beams, wherein the first column comprises a set of helical racks which are radially symmetric about a long axis of the first column.

In a fourth variant, nonexclusive from the first, second, third, or fourth, the first column comprises four helical racks, each bounding a respective storage cell of the plurality of storage cells. In an example, the set of helical racks comprises a first helical rack between the first and second beams, wherein the set of helical racks comprises a second helical rack between the second and third beams.

In variants, each of the columns defines an annular cross section in a first plane which is normal to a long axis of the column. In an example, each column comprises a cylindrical tube. In a second example, each annular cross section is radially symmetric (e.g., 90 degree radial symmetry).

In variants, a first column of the plurality of columns is joined with a first, second, and third beam, a reference plane intersecting the first, second, and third beams, wherein the first and third beams are joined by a bolt through the first column, wherein the first column comprises a first helical rack mounted the first and second beams, wherein the set of helical racks comprises a second helical rack between the second and third beams.

In variants, each beam comprises a set of rails for an AS/RS shuttle. For example, the AS/RS shuttle can be positionally indexed relative to a set of column features. In one variation, a position of each beam joined to a first column of the plurality is indexed relative to a first hole pattern on the first column, wherein a set of helical racks is mounted to the first column and indexed against a second hole pattern on the column.

In a second set of variants, nonexclusive with the first, an automated storage and retrieval system (AS/RS) comprising: a first column comprising rolled tube; four helical racks mounted to the first column, the four helical racks radially symmetric about a vertical axis of the first column; and a set of beams comprising: a first and second pair of beams mounted to the first column, a first plane orthogonal to the vertical axis intersecting the first and second pairs of beams; a third and fourth pair of beams mounted to the first column, a second plane orthogonal to the vertical axis intersecting the third and fourth pairs of beams, wherein the first and second planes intersect each of the four helical racks.

In one variant, the set of beams joins the first column to a first, second, third, and fourth column within a portal frame. As an example, the portal frame defines a first, second, third, and fourth cell between the first plane and second planes, wherein an AS/RS shuttle is configurable to traverse along a path, between the first, second, third, and fourth cells, which encircles the first column. As a second example, the portal frame defines an annular clearance region which encircles the first column between the first and second planes. In variations, the system further comprises a set of diagonal braces which extend between the first and second planes, wherein the set of diagonal braces do not intersect the annular clearance region.

2. Benefits.

Variants of the technology for automated storage and retrieval of materials can confer several benefits over conventional systems and methods.

First, variants of the storage grid can include a plurality of interconnected and individually manufactured modular cells, arranged in any desired configuration. The modular design enables the exact geometry of the overall storage grid to be configurable to a variety of client needs (e.g., modular grids can be adaptable to constraints in existing buildings, such as irregular walls, ceiling heights, mechanical elements of the building, etc.). Second, modularity can enable a user to expand an existing storage grid system when capacity demands increase, rather than needing to replace an existing system. Third, as each cell can be a self-contained unit, damage to a particular cell can leave adjacent cells undamaged in a modular configuration. This modularity can enable a user to replace one or more dysfunctional (e.g., broken, damaged, poorly manufactured, etc.) cells within a storage grid, rather than needing to replace and/or perform more costly system-wide repairs to an existing system. Fourth, variants of the system can include a plurality of individually structurally rated cells (and/or modular sections of the moment frame), which can enable clients to purchase and assemble a storage grid to their specific needs. Fifth, variants of the storage grid can enable fire resistance and/or fire-proofing of a material storage and handling system, as the storage grid can include gaps (e.g., between cells, within cells, within columns, etc.) that inherently enable air flow (and/or water flow when a sprinkler system is activated) within the storage grid. Sixth, variants of the system can provide more cost-efficient means of storage relative to conventional systems. In examples, variants of the storage grid can be manufactured using steel cold-forming techniques, which can produce a high-strength storage grid with reduced material inputs. Seventh, variants of the storage grid can be manufactured with a higher tolerance (e.g., using cold-formed steel and/or other high-precision manufacturing techniques), which can enable robotic sub-systems to navigate and maneuver within the storage grid. Additionally or alternatively, the robotic sub-systems can be involved in assembly and disassembly of cells and/or storage structures. Eighth, variants of the system can confer the benefit of having better seismic resilience compared with conventional cross-aisle rack systems, as well as be highly redundant and ductile in comparison. Ninth, variants can leverage precision fabrication techniques to ensure tight local tolerances within the frame (e.g., relationship between helical racks and beams/lateral support structures; symmetry around the column; etc.) which may increase control resilience to the larger deflections/deformations exhibited across the frame (e.g., local tolerance within 1 millimeter compared to a global tolerance of several centimeters).

However, the technology can confer any other suitable benefits.

3.1 Storage Grid 200.

The system 100 can include a storage grid 200, which can function to store and/or support a set of materials, such as, but not limited to, pallets, trays, trays loaded with goods, boxes, crates, a set of material handling robots 600 (e.g., robots holding one or more other materials), a combination of materials (e.g., simultaneously, asynchronously, etc.), and/or any other suitable materials.

In variants, the storage grid 200 (e.g., referred to equivalently herein as a 'storage rack' and/or a 'storage bay') can be made up of and/or define a plurality of adjacent cells, which can optionally interlock to form the larger storage grid. In variants, the cells can be modular units that can be arranged interchangeably to create a storage grid of any suitable size, such as a storage grid that spans multiple levels vertically and/or horizontally. In examples, the storage grid can be: a multi-level storage grid (e.g., a multi-level storage rack, 2 cells high, 3 cells high, 4 cells high, 5 cells high, 10 cells high, 20 cells high, greater than 20 cells high, any open or closed range bounded by the aforementioned values, etc.) with any number of cells arranged along a lateral plane, a single level storage grid with any number of cells arranged along a lateral plane, configured to be a cuboid shape (e.g., a plurality of rectangular configurations of cell sets stacked on top of another), configured to be an irregular shape, and/or any other suitable configuration (e.g., based on the storage needs of a facility in which the storage grid is used).

Figure 13:
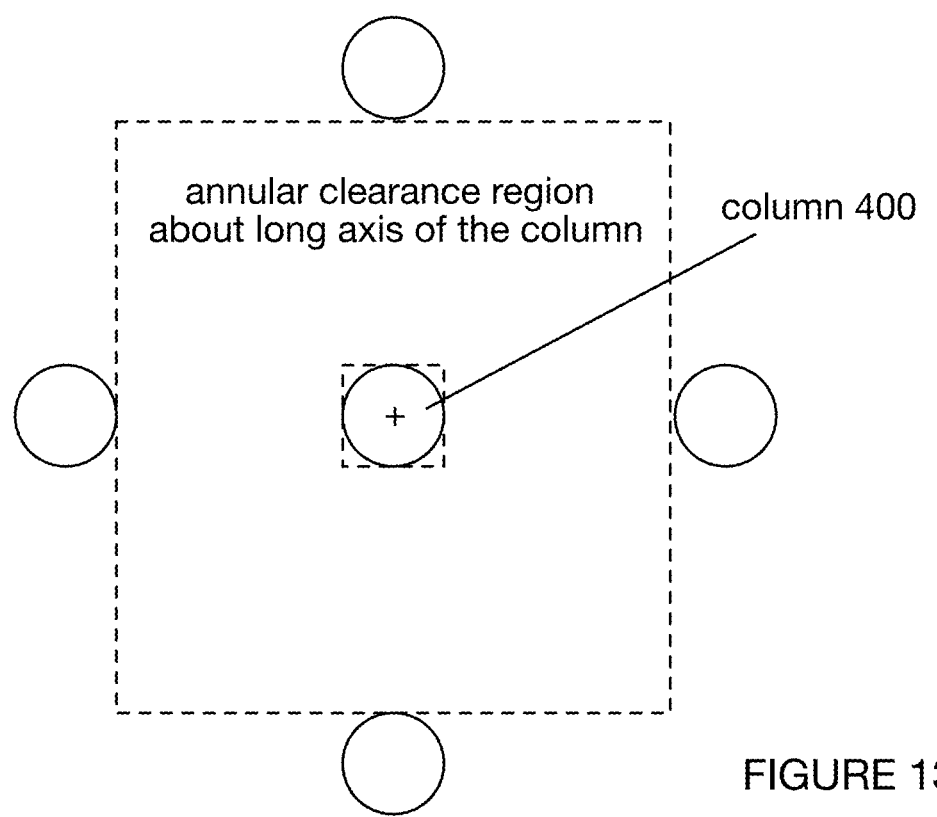
FIG. 13 is a top view schematic representation of a variant of the system.

Preferably, the storage grid is configured as a moment frame, which can confer several benefits configured to the use case of a material handling robotic system. For example, a moment frame storage grid can both support a downward load of the weight of the materials, and efficiently resist bending moments produced as material handling robots travel along the beams of the storage grid. Further, the open shape of a moment frame, defined by beams and columns, enables a material handling robot to travel between adjacent cells (e.g., by traveling on beam structural rails or up the columns of the cells) without maneuvering around additional support structures. For example, the robot can traverse along a path encircling a column and/or within a clearance annulus encircling a column of the frame (e.g., an example is shown in FIG. 13).

However, in additional or alternative variants, the storage grid can include (e.g., at all cells, at a subset of cells, etc.)

braced frames and/or other suitable structural configurations that provide sufficient stability and access for the material handling robot.

The storage grid can support a substantial amount of weight, such as up to 2000 lbs, 5000 lbs, 10000 lbs, or more (e.g., depending on specific requirements of a user). In variants, the weight capacity of the storage grid can be determined by factors such as the size and configuration of the cells, the materials used to construct the cells (e.g., steel, aluminum, composites, etc.), the number and arrangement of cells in the grid, and/or any other suitable factors.

In some embodiments, the storage grid can include additional features or components to enhance its functionality and/or adaptability. For example, the grid can include sensors, such as weight sensors, proximity sensors, and/or cameras, to monitor the contents and/or status of each cell. The grid can also include climate control systems, such as heating, cooling, and/or humidity control, to maintain optimal storage conditions for sensitive materials. Additionally, the grid can be designed to be modular and expandable, allowing cells to be added, removed, and/or rearranged as storage needs change over time.

Figure 2:
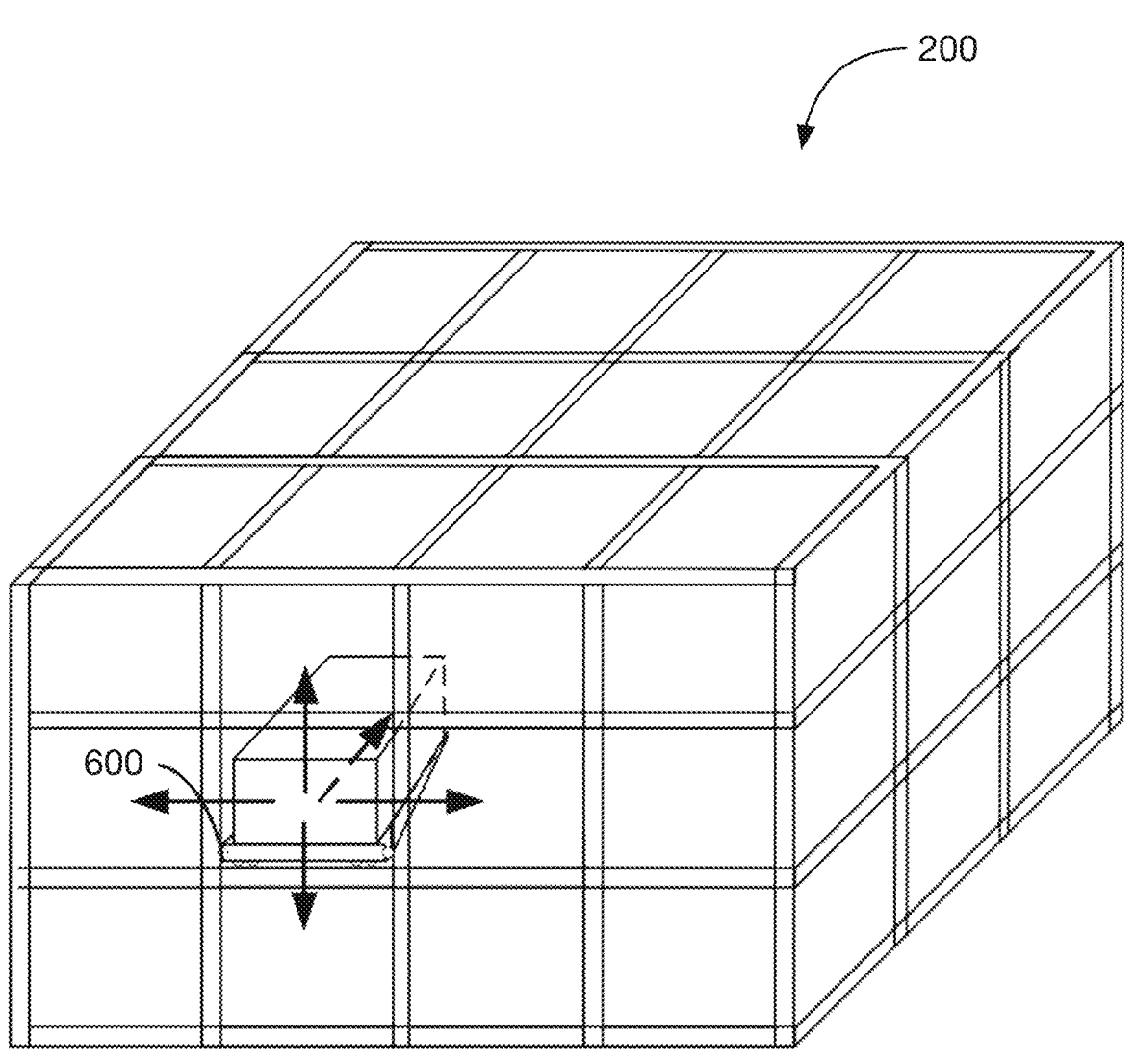
FIG. 2 is an illustrative representation of a variant of the system in use.

The storage grid is preferably configured to interface with (e.g., support) a set of material handling robots. In variants, the set of material handling robots 600 can function to transport a set of materials throughout the storage grid 200. An example of a material handling robot 600 maneuvering through a storage grid is shown in FIG. 2. In a first set of variants, the set of material handling robots 600 can store and support a set of materials for an extended period of time (e.g., throughout the duration of the material set's storage within the system), where the set of materials remains on the material handling robot throughout the duration of storage of the set of materials in the storage grid. In a second set of variants, the set of material handling robots 600 can transport the set of materials, deposit the set of materials at a position within the storage grid 600, and optionally later retrieve the set of materials at a later time.

A method for manufacturing a storage grid can include manufacturing cells, manufacturing columns, manufacturing beams, and/or any other suitable steps. Preferably, the method includes individually manufacturing and assembling each cell, wherein the storage grid can optionally be assembled by a third party (e.g., a client). However, the method can additionally or alternatively include assembling the storage grid. Methods of manufacturing cells, columns, and beams are described in sections 2.2., 2.3, and 2.4, respectively.

However a storage grid can be otherwise configured and/or include any other suitable components.

3.2 Cells 300.

Any or all of the system 100 (e.g., the storage grid 200) can include a set of one or more cells 300, which can each function as a modular unit that can connect to one or more other cells on one or more of its sides (e.g., top, bottom, lateral sides, etc.) to form a larger storage grid. A cell can preferably support a range of weights (e.g., hundreds of pounds, thousands of pounds, etc.) of materials being stored within the storage grid. Cells can include a plurality of beams, columns, joints, and/or any other suitable components.

The cell is preferably shaped as a cuboid (e.g., rectangular prism); however, in alternative variants the cell can be a non-rectangular prism, (e.g., triangular prism, a hexagonal prism, etc.), and/or any other suitable shape. In an example, the cell can include four vertical columns positioned at the corners of the cuboid, and a plurality (e.g., eight, four, etc.)

of horizontal beams (e.g., arranged at relative parallel and perpendicular angles) connecting the columns at various heights (e.g., the top and the bottom) to form a cell frame. In a second example, the cell can include another number of vertical columns (e.g., three to form a triangular prism, greater than 4 to form a non-rectangular prism, etc.), and a plurality (e.g., 3, 6, 5, 10, etc.) of horizontal beams arranged in various shapes (e.g., in a triangular arrangement, in a pentagonal arrangement, etc.) connecting vertical columns. Optionally, the cell may be configured to connect to other cells at different angles or orientations beyond just the top, bottom, and lateral sides. For instance, the cell may be configured to connect to other cells at an angle (e.g., a 45-degree angle) to form a diagonal or stepped arrangement of cells within the storage grid.

Cells are preferably individually manufactured and assembled, such that any number of desired cells can be joined together to form a storage grid of a desired size and shape. For example, the cells may be manufactured in a factory and transported to the site of the storage grid, where they can be assembled using various mechanical fasteners, such as bolts, lockbolts, rivets, welds, and/or any other suitable fastening means.

Additionally or alternatively, the beams and columns may be individually manufactured, while the cells are formed by assembling multiple beam and column components to form the overall structure of the storage grid. In an example, the storage grid may be constructed by first erecting a plurality of columns and then connecting the columns with beams at various heights to form the individual cells of the grid. Additionally or alternatively, cells can be formed by joining columns (e.g., which may span the height of a single cell or multiple cells) by beams and/or any other suitable components. However, the cells can be otherwise manufactured and/or assembled.

Joints (e.g., individual joints, joint assemblies, etc.) can function to join elements of a cell with other elements of the cell (e.g., beams and columns), to join adjacent cells, and/or can otherwise function. In examples, joining elements can include: welded material (e.g., formed from resistance spot welding), mechanical fasteners (e.g., bolts, rivets, etc.), and/or any other suitable fastening means. As an example, beams can be connected (e.g., in a pairwise configuration) on opposing sides of a column and/or node by through bolts. However a cell can be otherwise configured and/or include any other suitable components.

In variants, cells can be six-way shuttle cells (e.g., facilitating traversal into the six adjacent cells, across each face of the cell).

3.3 Columns 400.

The system 100 (e.g., the cells 300, the storage grid 200, etc.) can include a set of one or more columns 400, which can function to translate forces from the beams into the ground or other supporting structure, to interface with the material handling robot so that the material handling robot can climb via the columns, and/or otherwise function. In preferred variants, for instance, each of the cells is defined, at least in part, by a set of columns (and/or a helical rack[s] mounted thereto).

Preferably, columns and/or constituent column elements (e.g., column sections, node plates, spacers, etc.) are made of steel. However, columns and/or constituent column elements can additionally or alternatively be made of aluminum, titanium, other metals, alloys, material composites, and/or any other suitable materials. In variants, the column and/or constituent column elements can be manufactured using one or more of: injection molding, hot-forming (e.g., hot rolling, etc.), cold forming (e.g., rolling, pressing, stamping, bending, cold drawing, etc.), extrusion, and/or any other suitable manufacturing techniques. In examples, cold forming can provide the benefit of enabling complex and durable cross sectional geometries to be produced with fewer pieces relative to other techniques.

In a preferred variant, the columns can be roll-formed tubes (e.g., cylindrical cross section; octagonal cross section; etc.), however the columns can be otherwise configured.

Preferably, the column includes a plurality of parallel column sections. The column sections can be modular components that connect together along their long axis to form a complete structural column. Preferably, each of the column sections are identical (e.g., to reduce manufacturing costs), but alternatively two or more of the column sections can be non-identical (e.g., wherein two adjacent column sections include an interlocking component). Alternatively, the column can include a single column section (e.g., a single-component cross-section; such as a cylindrical tube, octagonal tube, annulus, etc.), which can reduce the overall complexity of the column itself, and/or any other suitable configuration.

In a first variant, the column can include a single column section. In examples, the column can be shaped with a square cross section, rectangular cross section, circular cross section, X-shaped cross section, and/or any other suitable cross section. The cross section can be solid, hollow, porous, and/or otherwise configured.

In a second variant, the plurality of parallel column sections can define a multi-component cross-section, with multiple (e.g., 2, 4, 3, etc.) sections (e.g., identical sections) that, when joined together, exhibit symmetry about one or more axes within the column's cross-section. Adjacent column sections can be touching, space (e.g., by space plates, etc.), and/or otherwise configured. In examples, a column with parallel column sections can enable the incorporation of connections between the column and the beam (e.g., via node plate and/or through an interior of a column), through assembly rather than the more costly processes (e.g., welding). Further benefits of a column with parallel column sections include the ability to incorporate reinforcements throughout the column, to manufacture the column using less steel, and/or any other benefits. In a first example (e.g., as pictured in FIG. 4), four column sections can be assembled to create a column with a cruciform cross-section. In a second example two column sections can be assembled to create a column (e.g., with a symmetric cross section about one center axis of the column).

In a third variant, the column can include a pipe running through the center of the column. This configuration enables the flow of water, air, and/or any other suitable fluid through the column. The column sections may incorporate holes that align with valves in the pipe, allowing the fluid to escape in the event that the fire suppression system is triggered. In a first example, the column can be a tube (e.g., a single column section) with a pipe through its center. In a second example, the column can have a multi-component cross-section, where parallel column sections are spaced by a plurality of spacers. This example can confer the additional benefit of increasing the column's strength, as the distance from the central axis to a point where bending forces are applied is increased. Additionally or alternatively, the columns may have a height of less than 40 feet (e.g., 20 feet, 25 feet, 30 feet, 35 feet, 40 feet, any open or closed range bounded by the aforementioned values, etc.) and rely on external fire retardants/sprinklers.

The columns preferably have a uniform, annular cross section which is substantially symmetric about the long axis (e.g., 90 degree radial symmetry), but can additionally or alternatively include structural bends/folds to improve the structural properties.

In some alternate variants, column sections can optionally include one or more reinforcement features, which can function to stiffen the column in one or more directions, such as parallel to the column's long axis. In variants, the reinforcement features can be a part of the column itself, such as ribs (e.g., v-ribs, striation ribs, bead ribs, pencil ribs, stiffening ribs, clip relief, and/or any other suitable rib configuration), flanges, hems (e.g., rolled hem, open hem, flat hem, teardrop hem, rope hem, and/or any other suitable hem configuration), embosses, and/or any other suitable integral reinforcement feature. For example, as shown in FIG. 6A, the reinforcement features can include rib stiffeners with additional curved geometries, which can further increase the strength of the part. As another example, as shown in FIG. 6B, the reinforcement features can include rib stiffeners. The reinforcement features can be incorporated as a part of the original manufacturing technique that produces the column section (e.g., extruded, cold-formed, hot-rolled, injected, etc.), or added after a column section is formed (e.g., punched, stamped, etc.), and/or otherwise manufactured. Additionally or alternatively, the reinforcement features can include an additional component coupled to the column, such as a bracket, plates, and/or any other suitable additional reinforcement component. The additional component can be coupled to the column in any suitable manner, such as welding, fastening, adhering, and/or any other suitable coupling mechanism.

Optionally, the column can further include one or more components that nest between adjacent column sections (e.g., node plates, spacers, spacer plates, reinforcements, etc.). Examples are shown in FIGS. 7 and 10A-10D. In preferred variants, for instance, the system includes a set of spacers (e.g., spacer plates) that can confer numerous benefits such as, but not limited to: enabling multiple pallets to occupy the same cell; enabling connection of the cell with other components (e.g., fall arrest anchors, cell enclosure guarding, seismic energy dissipating devices, etc.); and/or otherwise conferring one or more benefits.

Figure 4:
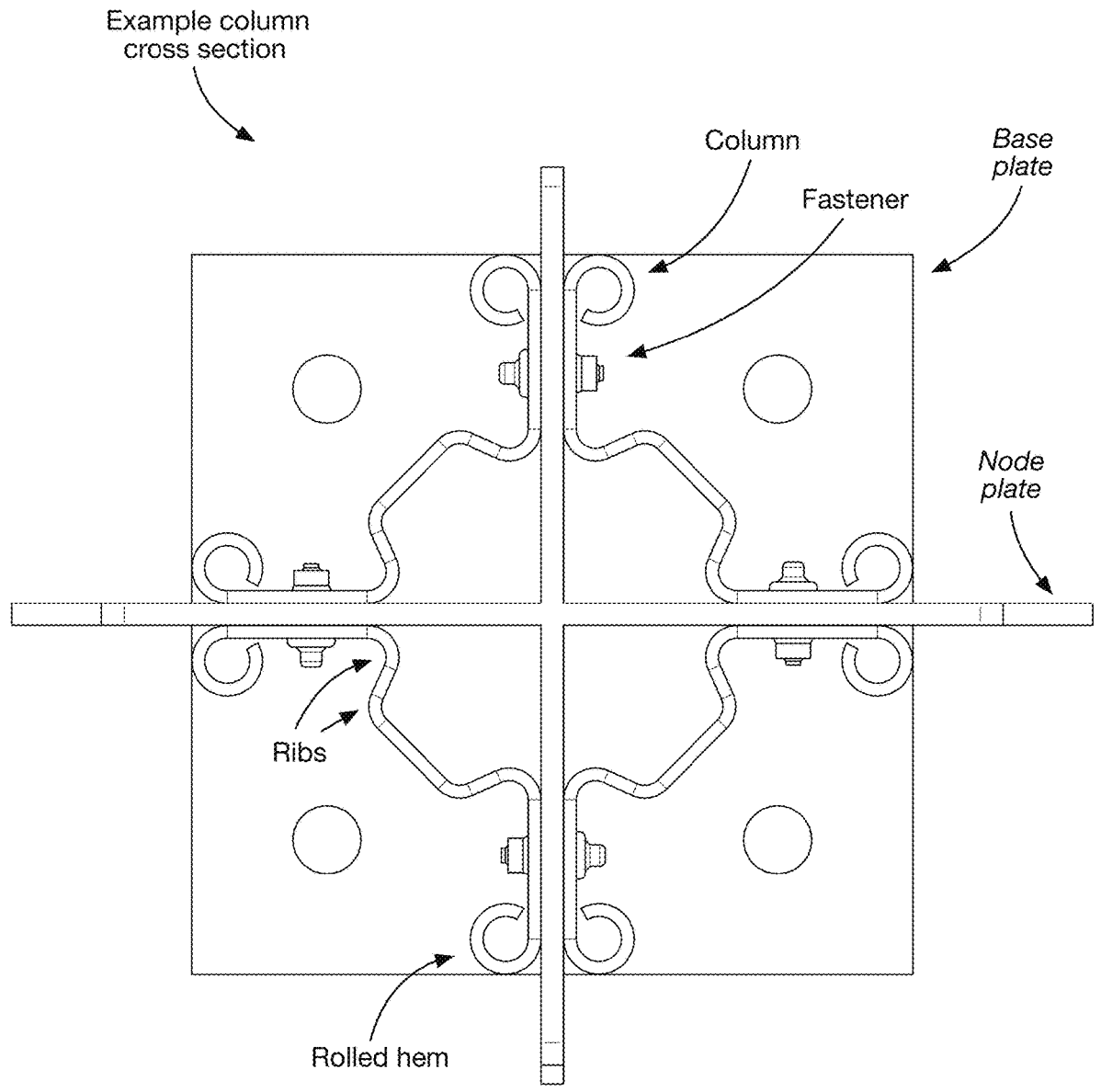
FIG. 4 is an illustrative representation of a variant of a multi-component column cross section.
Figure 5A:
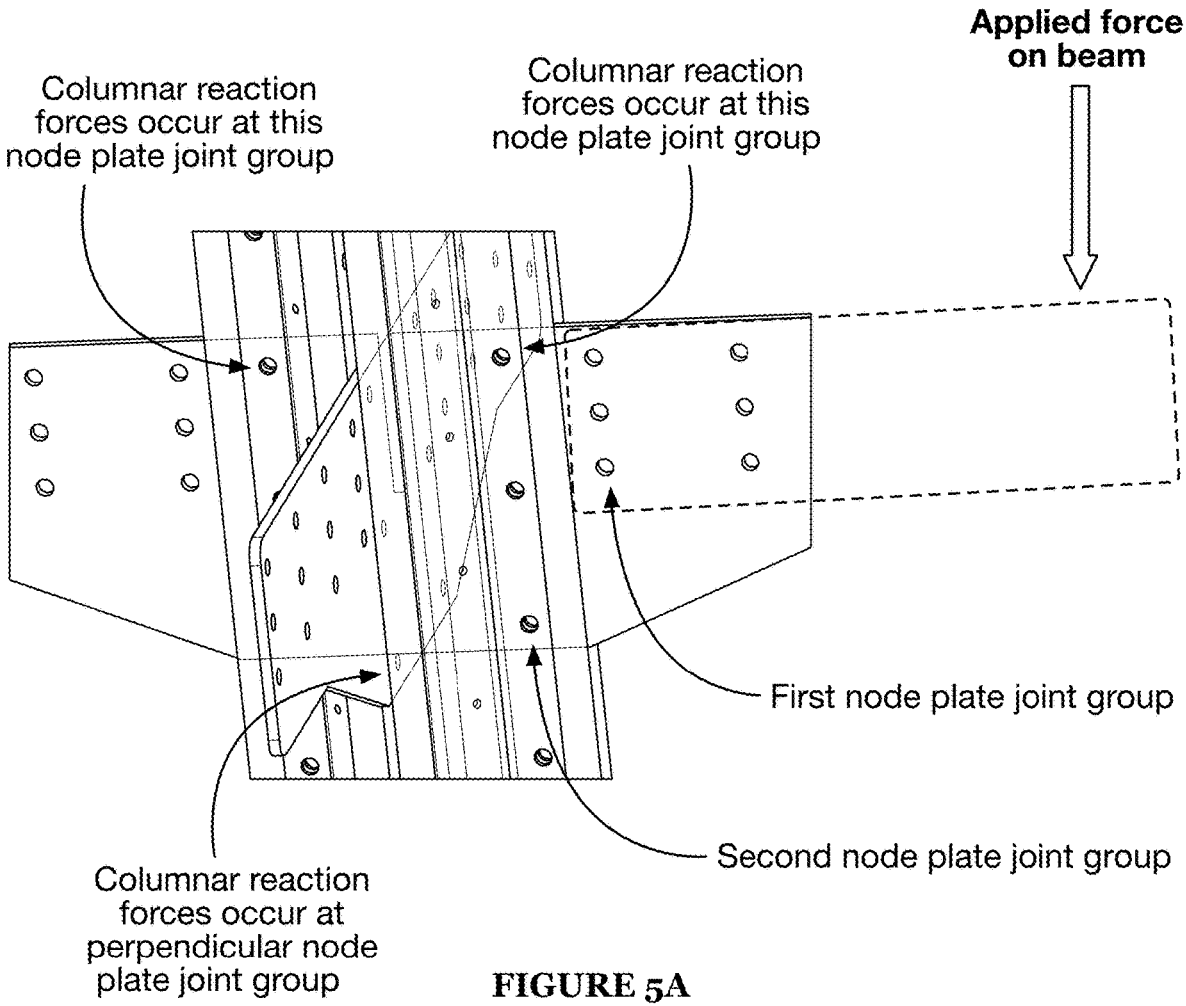
FIGS. 5A-5B depict an illustrative representation of a variant of resultant loads within the system.
Figure 5B:
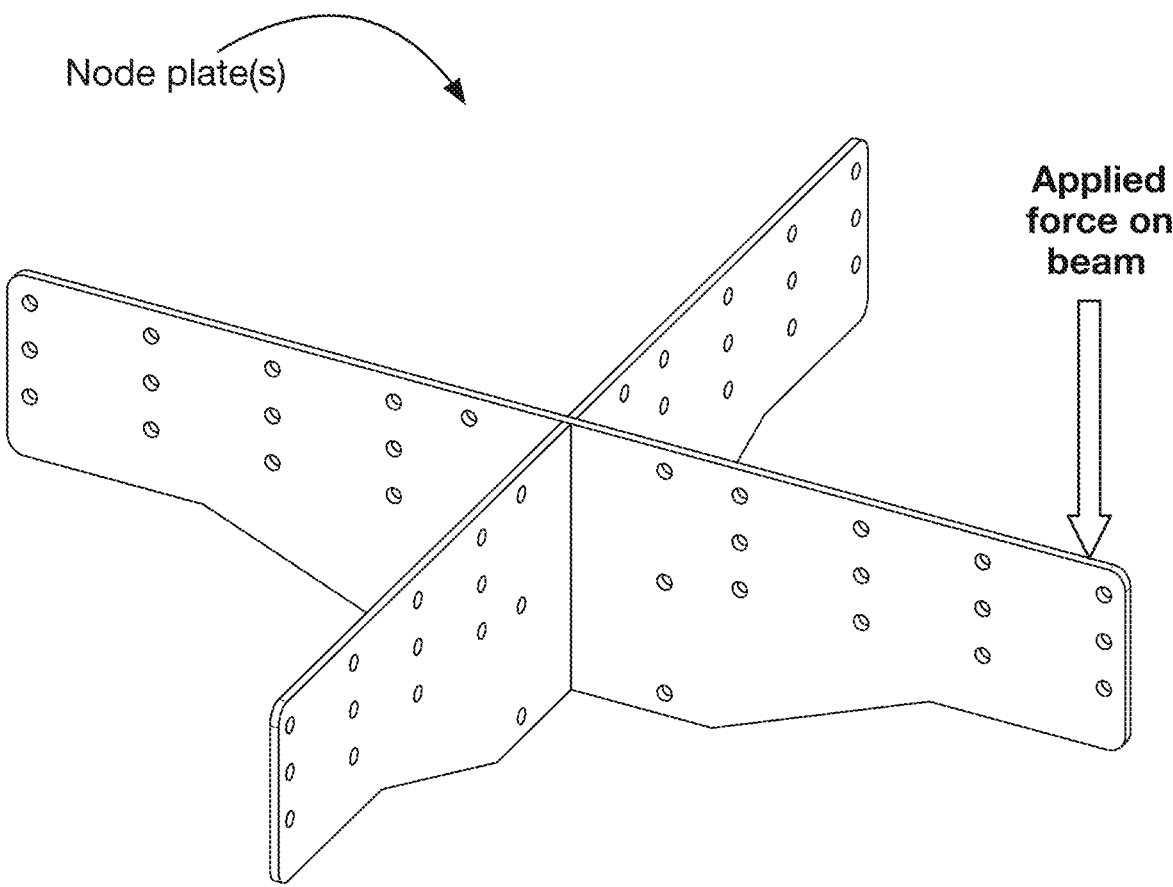

Optional node plates (e.g., as shown in FIG. 4 and FIGS. 5A-5B) can function to support the column and form part of the junction between the column and beams. Node plates can further function to ensure a balanced distribution of forces throughout the structure, for example transferring bending moments from the beam into the column, and/or otherwise function. Node plates can enable an entire multi-component cross-section to act as a single, unified piece. In an example, the joints between the node plates and the beams (e.g., which can include holes and bolts), can function to transfer shear forces and force couples into the node plates. Similarly, the joints can create a moment on a side of the column proximal to beam loading. Node plates that extend to the opposite side of the column can also help to transfer the load to the opposite side of the column. Multiple perpendicular node plates and/or other similar cross-shaped supports can further transfer the load to a face of a column section perpendicular to the loaded beam. Examples are shown in FIGS. 5A-5B.

The node plates can nest between the column sections. Optionally, multiple (e.g., two) node plates can be joined to form a cross-shaped profile with arms extending in four directions, allowing them to fit snugly within the spaces between the column sections (e.g., as shown in FIG. 4). Additionally or alternatively, node plates can sit on an outer perimeter of the column sections, and/or be otherwise configured. Node plates can be attached to the column sections: using mechanical fasteners (e.g., bolts, screws, nuts, prestressed bolts, etc.), welding, press-fitting, and/or any other suitable means.

Figure 7:
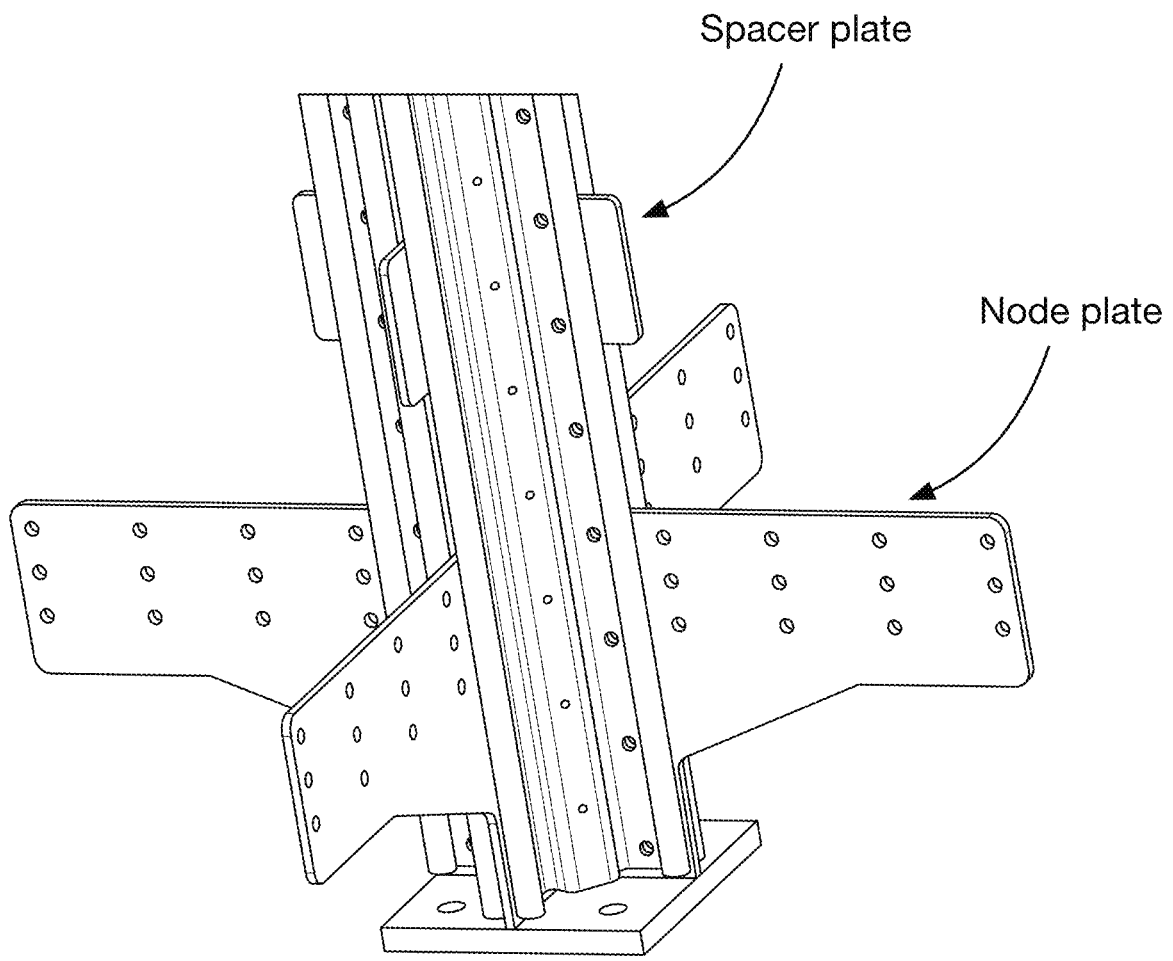
FIG. 7 is an illustrative representation of a variant of a portion of a column.

Optional spacers (e.g., spacer plates as shown in FIG. 7) can function to maintain the rigidity and structural integrity of the column sections between the node plates. Spacers can be positioned at various intervals along the length of the columns to provide additional reinforcement and support. Additionally or alternatively, spacers can be positioned between adjacent cells, beams, and/or otherwise positioned. In variants, spacers can be nested between the column sections. The spacers can be securely coupled to the column sections (and/or to one or more other spacers) using press fitting, welding (e.g., spot welding, laser welding, etc.), riveting, mechanical fastening, and/or any other suitable means. Spacers preferably include two perpendicular components (e.g., spacer plates) that form a cross-shaped spacer, but can additionally or alternatively include a single spacer, four spacers that form a cross, and/or any other suitable number of spacers. In a specific example, two or more spacer plates can be securely connected to form a spacer (e.g., cruciform spacer) using a press-fit joint, where the plates scissor together and are held in place by the precise geometry of the interlocking features (e.g., without additional fasteners).

However, a column can be otherwise configured and/or include any other suitable components.

Additionally, the columns can include or be used in conjunction with helical racks (e.g., mounted between beams), such as those described in U.S. application Ser. No. 18/493,278, filed 24 Oct. 2023, U.S. application Ser. No. 18/531,184, filed 6 Dec. 2023, and/or U.S. application Ser. No. 19/046,366, filed 5 Feb. 2025, each of which is incorporated in its entirety by this reference.

For example, helical racks can be mounted to the columns between beams (e.g., 90 degree radial symmetry, etc.), examples of which are shown in FIGS. 11A-11C, FIG. 15, and FIG. 16.

3.4 Beams 500.

The system 100 (e.g., the cells 300, the storage grid 200, etc.) can include a set of one or more beams 500, which can function to support the material handling robot as it moves laterally along the storage grid, as well as to support the load of various materials being stored on the storage grid. The beam is preferably manufactured from cold-formed steel, which can reduce the amount of material needed compared to manufacturing it as one continuous beam while still meeting structural requirements. Cold-formed steel can also enable unique, complex, and elaborate part geometries that are strong and enable other functionalities, such as serving as a rail or guide rail, without needing additional components. Additionally or alternatively, the beam can be manufactured using hot-forming techniques (e.g., hot-rolling), extrusion, injection molding, and/or any other suitable manufacturing technique. Additionally or alternatively, the beam can be manufactured from aluminum, titanium, other metals, alloys, material composites, and/or any other suitable materials.

Figure 8:
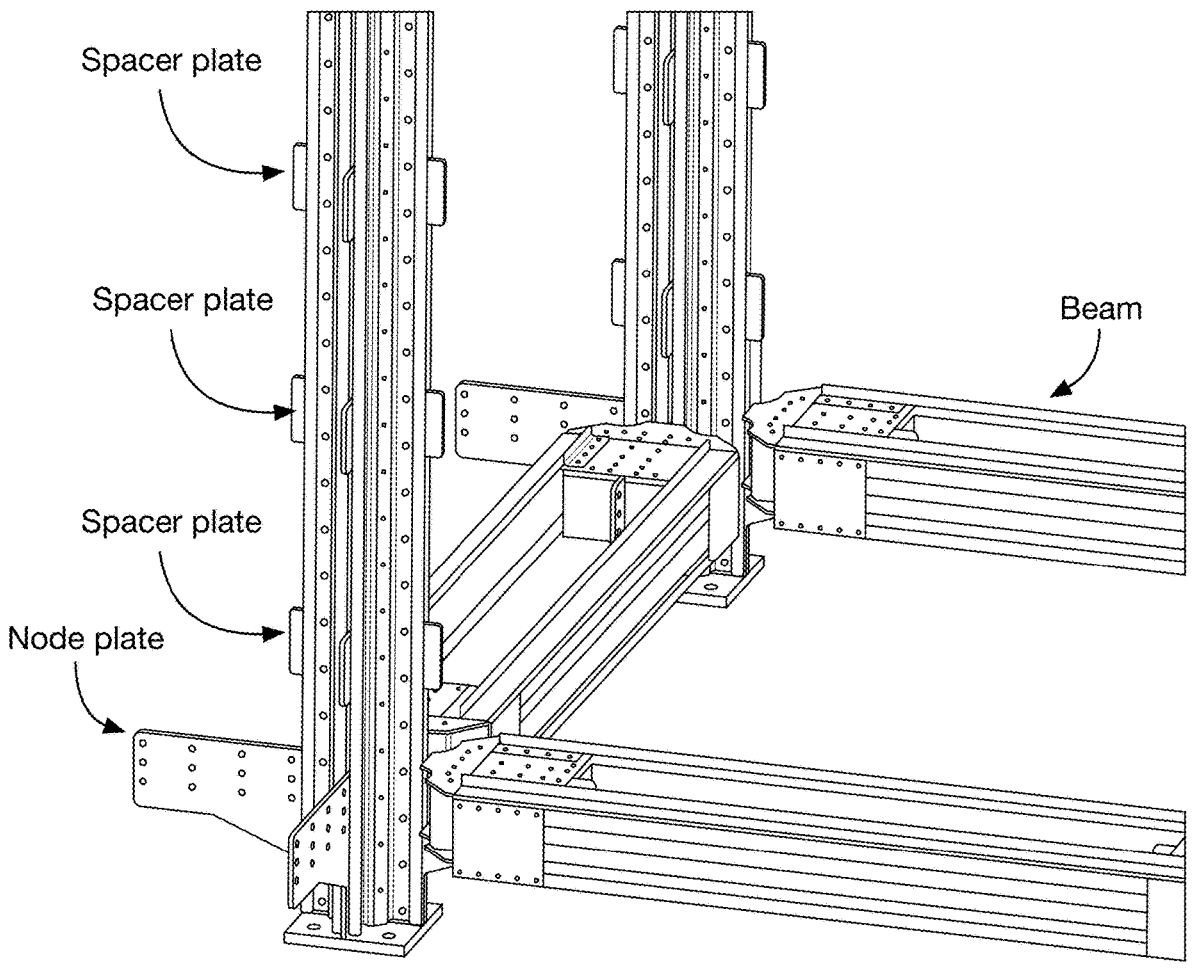
FIG. 8 is an illustrative representation of a variant of a joint between a column and a beam assembly.
Figure 10A:
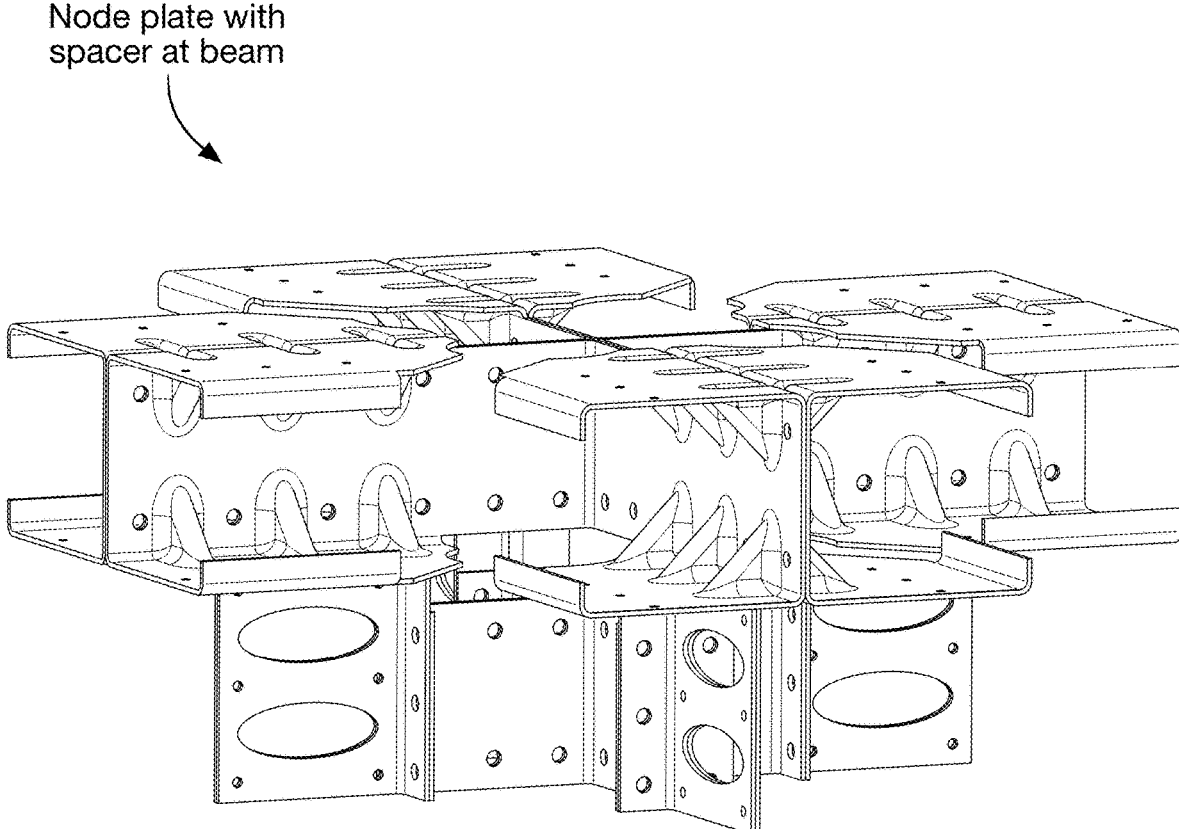
FIGS. 10A-10D depict variants of the node plate and spacer plate.
Figure 10B:
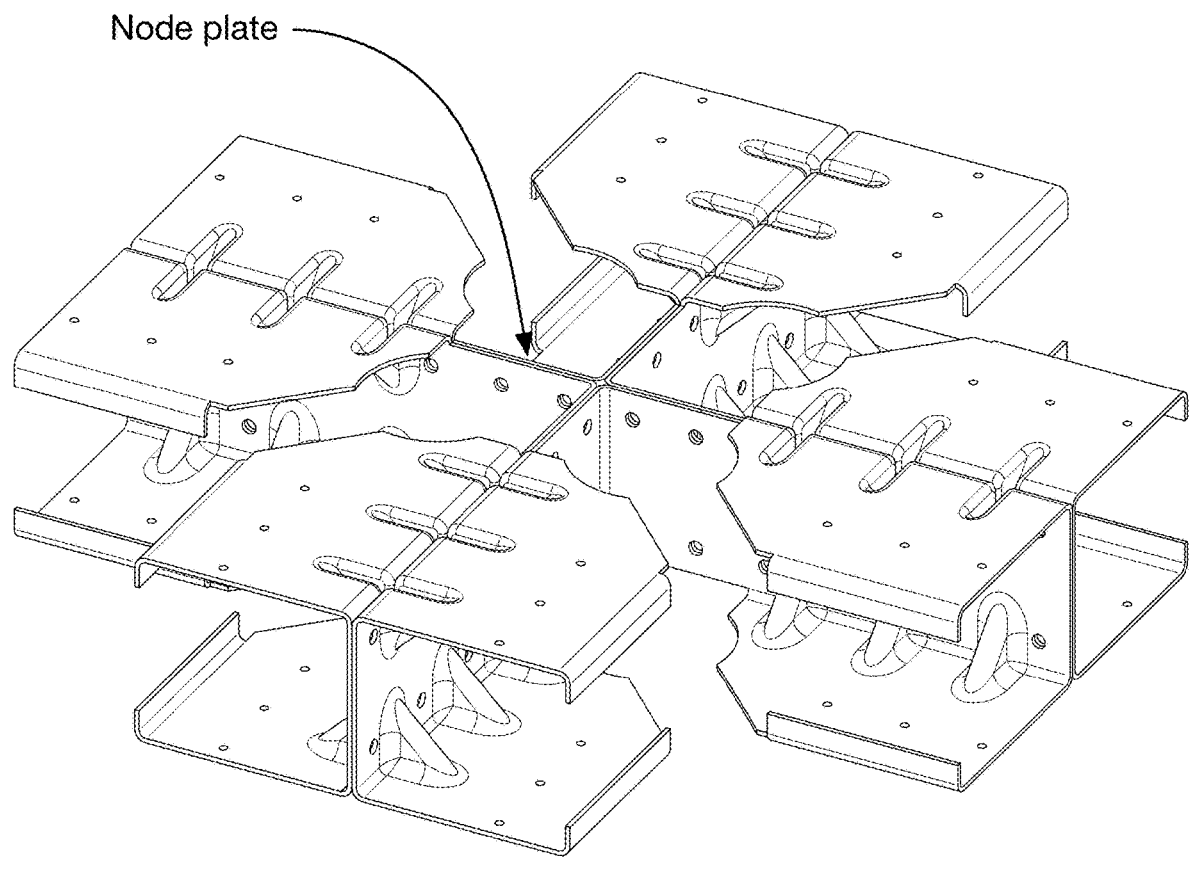
Figure 10C:
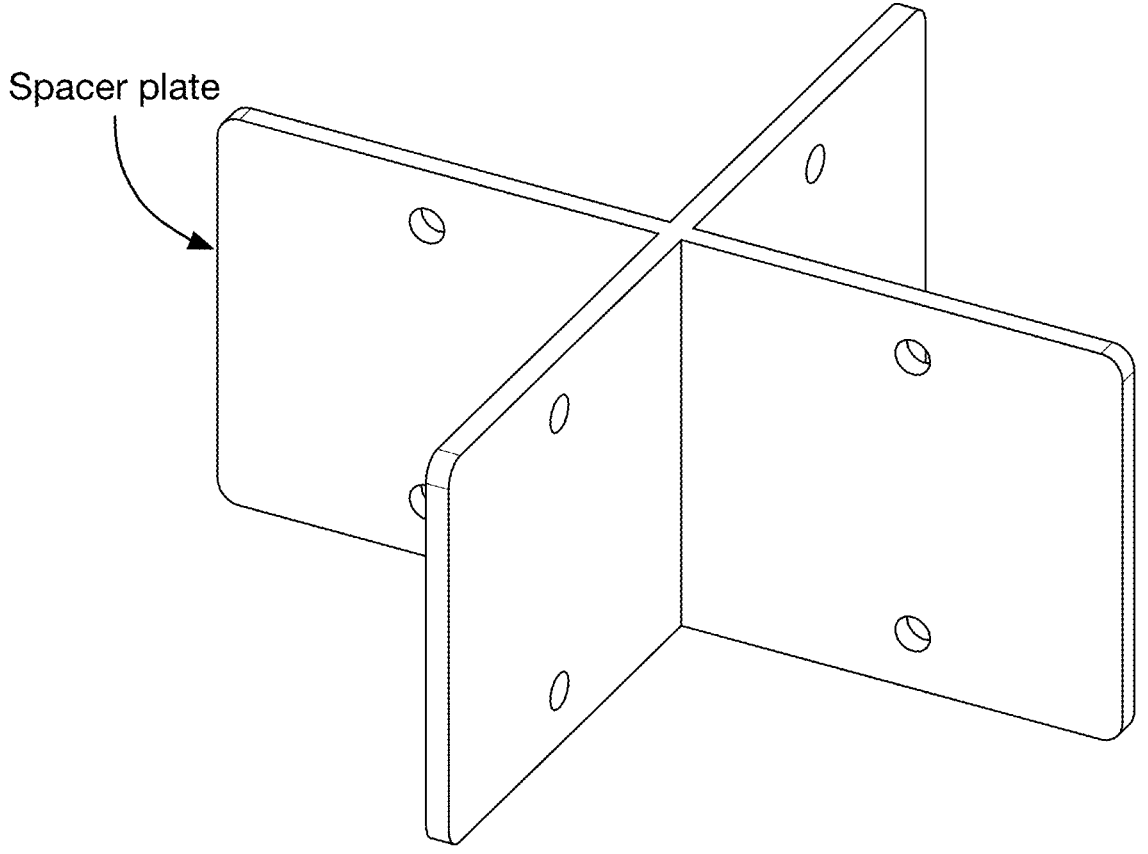
Figure 10D:
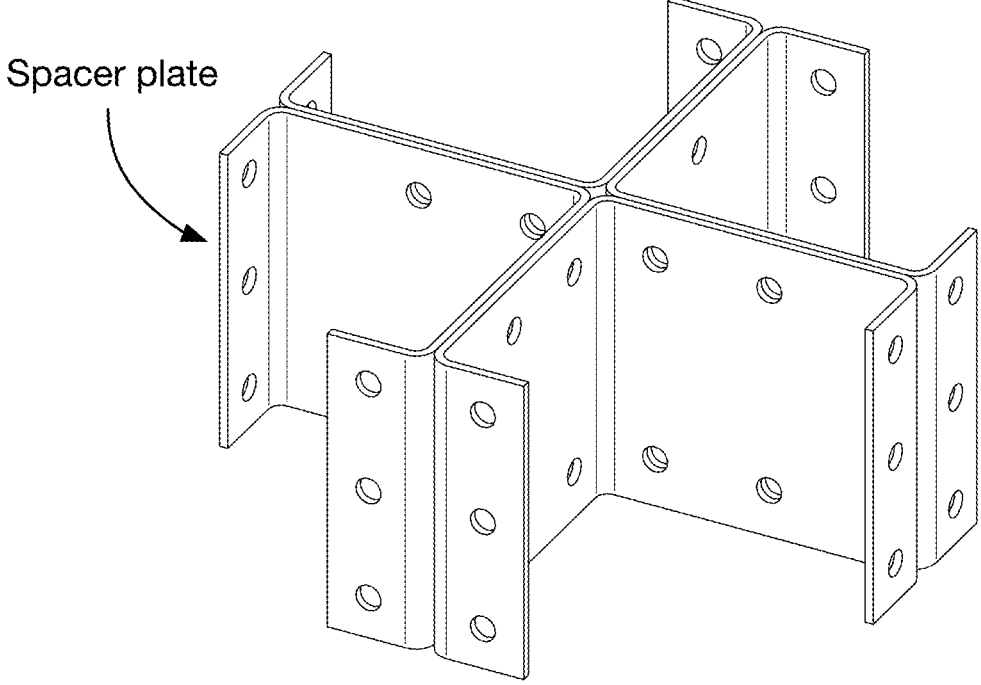

The beam can attach to the column directly and/or via an intermediate set of one or more components coupled to the column (e.g., a node plate as shown in FIG. 8). In a preferred set of examples, the beam (e.g., the beam assembly) includes one or more components that are coupled to other system components and/or other beam assembly sub-components using only mechanical fastening means (e.g., bolts, pressfits, etc.) as opposed to welding or other heated means that can warp or otherwise deform the beams. However, welding or other similar joining means can alternatively be used.

Beams can optionally be made of two parallel beam components, each of which can define a separate track, which can enable a material handling robot to navigate within a cell by moving along two parallel tracks between adjacent parallel beams. In a preferred set of variants, when the cell is assembled, all or a portion of each of the parallel beam components protrudes beyond a width of the column to which the parallel beam components are coupled (e.g., as pictured in an example in FIG. 3 and FIG. 7). This configuration can allow the material handling robot to travel on either side of a column without needing to move around it and/or otherwise retract a component. For example, the parallel components may be offset from the column by a distance sufficient to allow a lateral movement mechanism (e.g., wheels) of the material handling robot to pass between two parallel columns defining the sides of a cell.

The two parallel beam components are preferably configured as two separate components (e.g., bars, beams, rails, etc.) that are each coupled at either end to a column, and/or each coupled to one another. Additionally or alternatively be a single continuous beam with two parallel features, and/or otherwise configured. For example, the parallel components can be part of a single beam that protrudes on either side of the column, creating a track on each side for the material handling robot to follow.

The beam can optionally be and/or include a beam assembly, which can include one or more of: parallel beam components, spacers/blocks (e.g., which can function to rigidly maintain a spacing between two or more parallel beam components), stiffening elements (e.g., plates, brackets, flanges, etc.), coupling means (e.g., joints, bolts, nuts, etc.), and/or any other suitable components. The beam may optionally include flanges (e.g., resistance spot-welded flanges), for additional stability and/or to help connect components.

In a first variant, the beam can have a Z-shaped cross-section. In a first example, the beam can have a traditional Z-shaped cross-section, such as a standard Z-shaped purlin form factor (e.g., as shown in FIG. 9C). In a second example, the beam can have a modified Z-shaped cross-section, with a diagonal component (e.g., as shown in FIG. 9A), which can reduce torsion within the beam as a loading force applied from a material supported by the beam (e.g., the wheel of the material handling robot) is applied over the center of the beam. In variants this loading pattern can result in symmetric yield and prevent hysteresis loops under severe loads. This configuration (and/or any other cross sectional beam configuration) may optionally include (e.g., on the beam exterior) one or more additional reinforcement components (e.g., plates) to transfer an applied force into spacers within the beam assembly (e.g., as shown in FIG. 9A).

In a second variant, the beam can have a sigma-shaped cross-section (e.g., as shown in FIG. 9B), which can similarly reduce torsion by positioning a load over the center of the beam, while reducing part complexity (e.g., as compared to the Z-shaped configuration). This configuration (and/or any other cross sectional beam configuration) may optionally include one or more additional reinforcement components, for example, to prevent torsion within the beam.

Figure 3:
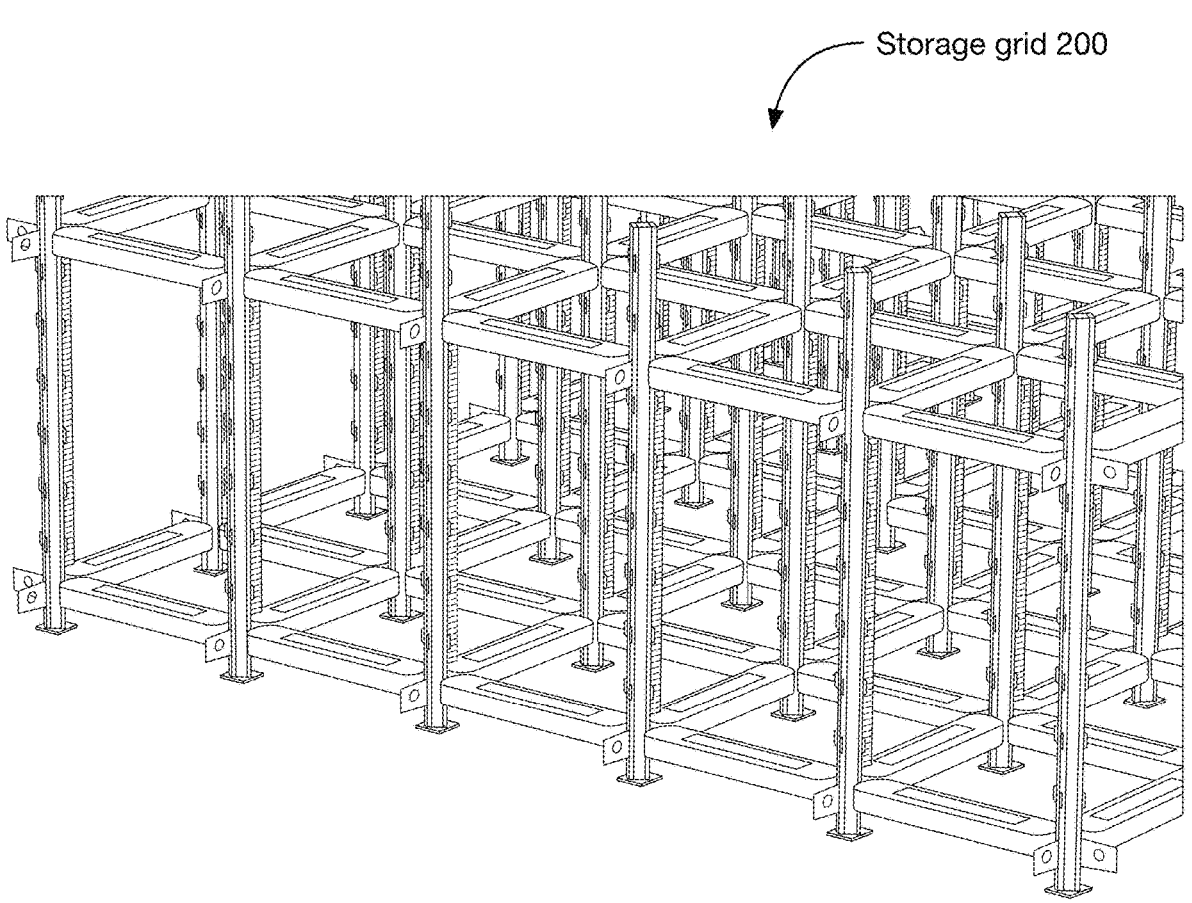
FIG. 3 is an illustrative representation of a variant of system.

In a third variant, the beam can have a rectangular cross-section (e.g., as shown in FIG. 3), which can be hollow (e.g., a tube), solid, and/or have any other internal geometry.

In further variants, the beam can have any other suitable cross section, for example: an I-beam, a C-beam (e.g., as shown in FIG. 9D and FIG. 9E), an ovular and/or circular cross section, a solid cross section, a hollow cross section, and/or any other suitable form factor.

Additionally, in variants the beam structure can provide a datum (e.g., base plane datum for lateral translation surface) for a robot. For example, the geometry of the beam structure can be indexed against a feature(s) of the column, such as a hole pattern, structural fold, or other geometric reference, which may facilitate high precision local alignment (e.g., tolerance less than 2 millimeters, 1 millimeter, etc.) and/or references between the beam and/or lateral degrees of freedom of the robot (e.g., X/Y) and the helical racks. As an example, both the beams (or datum structures associated therewith) and the helical racks can be mounted to a high tolerance hole pattern along the column (e.g., laser cut), which may facilitate a tight local tolerance even under the proportionally large deformations of the frame structure (e.g., on the order of several centimeters).

However, a beam can be otherwise configured and/or include any other suitable components.

Figure 12:
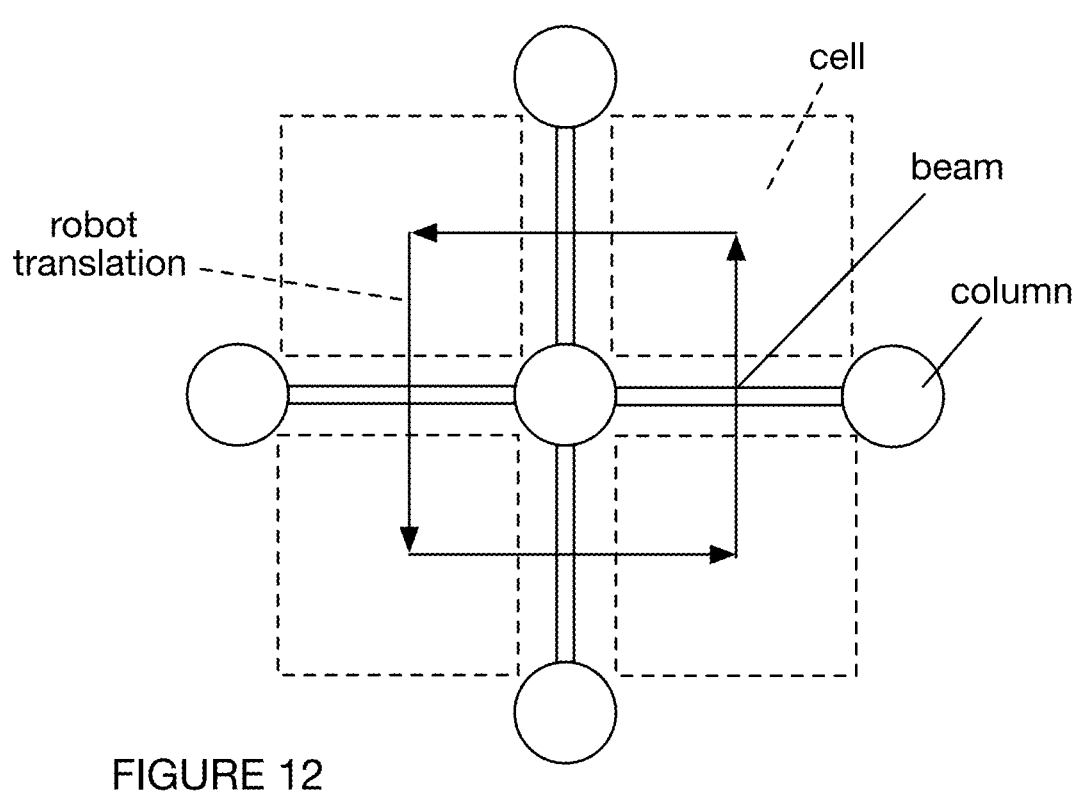
FIG. 12 is a top view schematic representation of a variant of the system.

In variants, the columns 400 and beams 500 can form a portal frame structure (e.g., without diagonals/bracing between interior cells). For example, portal frame, without diagonals, may allow circumferential translation of a robot around the long axis of a column (or beam) within an interior of the portal frame (e.g., examples are shown in FIGS. 12 and 13). Additionally or alternatively, the frame can be diagonalized and/or may include (diagonal) bracing at the periphery of a subset of cells, and/or spanning (peripheral) faces of peripheral cells.

4. Method.

A method for automated storage and retrieval of materials can include: optionally assembling a storage grid, deploying a fleet of material handling robots (e.g., a fleet of one or more robots), loading a fleet of material handling robots with a set of materials (e.g., packages, pallets, etc.), navigating a fleet of material handling robots throughout the storage grid, retrieving a material handling robot, and/or any other suitable steps.

In variants, navigating the fleet throughout the storage grid can include: maneuvering (e.g., vertically, laterally, etc.) a material handling robot (e.g., between adjacent cells, within a cell, out of the storage grid, into the storage grid, etc.), planning a path (e.g., on an individual level for a single material handling robot, at a fleet level for a subset of and/or all of the material handling robots in the fleet, etc.), sending a set of control signals to the material handling robots, controlling a set of actuators (e.g., of the material handling robots, of the cells, of the beams, of the columns, etc.), and/or otherwise navigating the fleet. In variants, navigating a material handling robot can include controlling the material handling robot to move laterally (e.g., along the beams of a cell), vertically (e.g., along the columns of the cell, via an interlocking joint with four columns at each of four corners of the material handling robot, etc.), and/or otherwise maneuver.

However, a method for automated storage and retrieval of materials can include any other steps.

5. System-Robot

The system can optionally interface or include a set of one or more material handling robots 600, wherein the robots can, individually and/or collectively, function to transport and/or store load(s) (equivalently referred to herein as materials and/or goods) within a storage structure. Additionally or alternatively, the robots can function to transport materials between storage structures, and/or perform any other suitable functions.

The robot preferably includes and/or defines a broad surface, equivalently referred to herein as a platform, where the platform functions to support the materials during movement, storage, and/or at any other times. Additionally, the robot can define a full or partial enclosure to contain materials, a cavity, and/or any other suitable features for containing material(s).

The robot preferably defines and/or includes a set of extendable and/or retractable arms (e.g., bars, linkages, appendages, etc.), wherein the arms function to enable smooth and controlled movement of the robot through the storage structure. This can include smooth and controlled vertical movement. Additionally or alternatively, the arms—by retracting and/or extending—can function to: enable transitions between directions of movement, such as between vertical movement and horizontal movement; enable transitions between different cells of a storage structure (e.g., retracting arms to fit between boundaries of neighboring cells); and/or otherwise facilitate movement of the robot within the storage structure.

In preferred variants, the robot includes multiple arms, where the multiple arms are controlled according to a set of control algorithms (e.g., as described below) and can be: independently controllable (e.g., during vertical movement, during horizontal movement, etc.); collectively controllable (e.g., during horizontal movement); and/or otherwise suitably controlled.

Figures 11A, 11B, 11C:
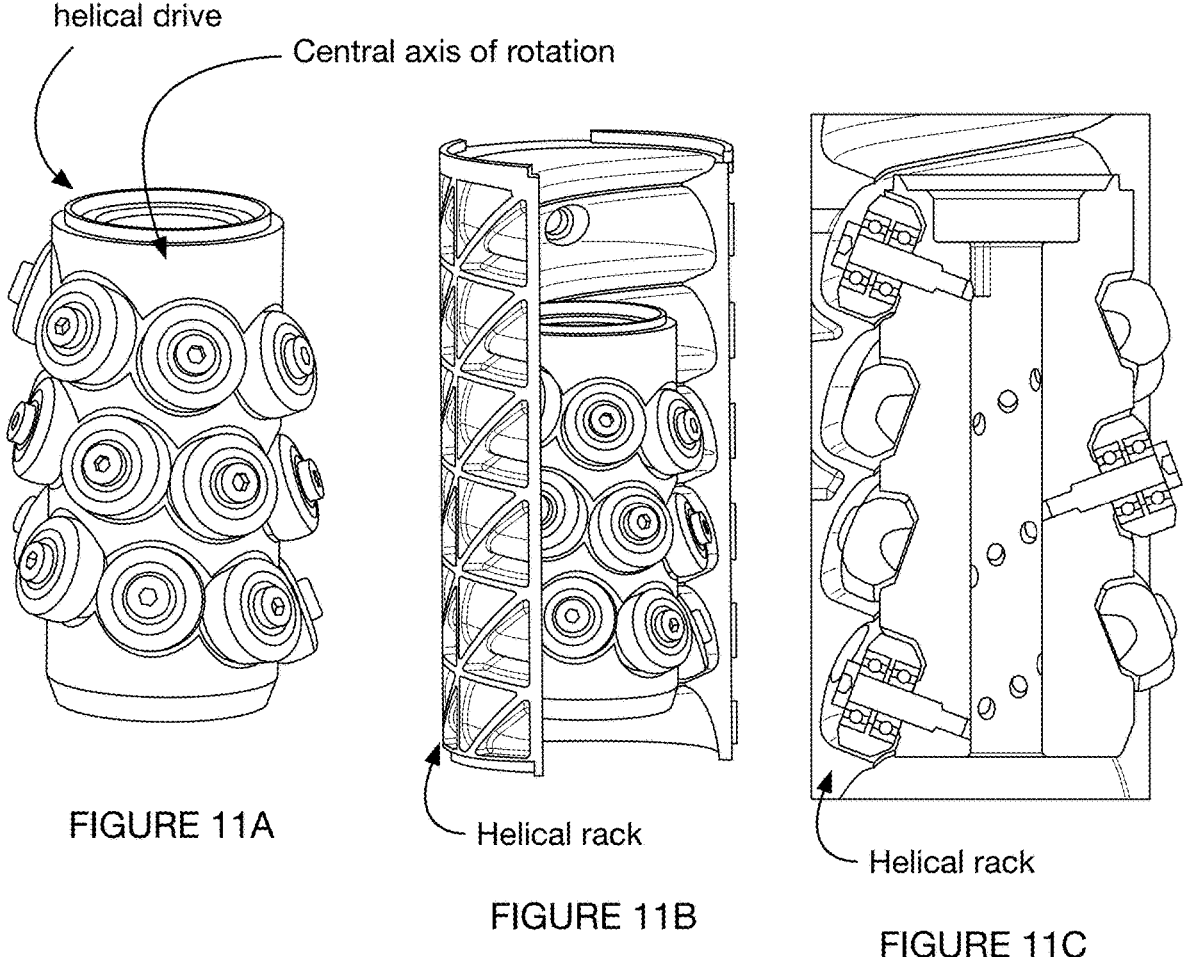
FIGS. 11A-11C illustrate an example of a helical drive mechanism, a helical rack, and a cross-section of an interface between the helical drive and the helical rack, respectively.

Each of the arms preferably includes and/or defines one or more end effectors at a distal portion of the arm, where the end effector(s) function to engage with and move along a vertical structure (e.g., helical rack) of the storage structure. In preferred variants, each of the end effectors includes a helical drive that is rotatable about its central axis, this rotation causing vertical movement of the robot. In examples (e.g., as shown in FIGS. 11A-11C), the helical drive includes a helical arrangement of ball bearing rollers that engage with grooves of a complementary rolling surface on a helical rack (e.g., as shown in FIGS. 11B-11C), where rotation of the helical drive about its central axis causes linear translation of the arm along the helical rack. In a specific example (e.g., as shown in FIG. 11C) each of the ball bearing rollers is tilted with respect to the central axis, which functions to increase a surface area of contact between the rollers and the helical rack, which can function to decrease and/or prevent slippage. Additionally or alternatively, the arms can include any other suitable end effectors.

In a set of examples, the robot includes 4 arms, wherein the axes defined by each of the arms intersect along a central axis of a platform of the robot. Each arm is preferably extendable and retractable such that a wheel or other end effector coupled to the end of the arm can change its position in space. Additionally or alternatively, the robot can include any other number of arms, arms defined at other orientations, and/or the robot can be otherwise suitably configured.

The robot preferably includes a set of actuators (e.g., motors, linear motors, rotary motors, etc.), where the actuators preferably function to enable each arm to move with 2 degrees of freedom. In preferred variants, for instance, each arm includes a linear actuator configured to enable retraction and extension of the arm, and a rotary motor (equivalently referred to herein as a helical drive) configured to rotate an end effector of the arm, which enables vertical climbing of the robot within the storage structure (e.g., as described below). Additionally or alternatively, the robot can include any suitable actuators.

The robot can optionally include a set of springs (e.g., 1 per arm), equivalently referred to herein as lateral springs, which can function to: cushion the end effectors against minor perturbations during movement; enable normal forces between the end effector and storage structure to be maintained during movement; enable measurement of normal forces to be determined (e.g., and used as inputs in a set of control algorithms); and/or enable any other functions. In specific examples, for instance, each arm includes one or more pre-loaded lateral springs that provide built-in passive compliance and apply normal force against helical racks of the storage structure.

In variants, the arms are preferably controlled independently of the helical drive to maintain compression against the racks. For example, the arms and/or springs therein are preferably actuated using feedback controls (e.g., force feedback controller, such as a PID control scheme), independent of the vertical motion and/or helical drive controls. Additionally or alternatively, the arms can be actuated and/or controlled based on a relative position of the robot along the racks (e.g., independent of velocity), controlled with the helical drives stationary (e.g., as part of a calibration and/or deployment sequence), controlled with the helical drives in motion, and/or can be otherwise suitably controlled.

The robot can optionally include any number of other components, such as: horizontal movement mechanisms (e.g., rail trucks/wheels) that can be used to move along tracks in x-y planes of the grid storage structure, and/or any other components. In a preferred set of variants, the robot includes and/or defines: a platform configured to support a set of materials; a set of arms configured to enable smooth and controlled vertical movement of the robot in a storage structure, each of the arms including a rotatable end effector; a set of linear actuators and springs that enable retraction and extension of the arms; a set of rotary actuators that enable rotational movement of the end effectors; and/or any other components.

Additionally or alternatively, the robot can include any other components.

The robot can include or be used in sensor suite which functions to collect measurements to facilitate actuation controls and can additionally function to facilitate autonomous perception/navigation of the robot. The sensor suite can include: proprioception sensors, actuator encoders, internal sensors (e.g., encoders, actuator sensors, accelerometers, gyroscopes, IMU, INS, temperature sensors, voltage/current sensors, etc.), environmental sensors, antennas (e.g., GPS, cellular, Bluetooth, Wi-Fi, Near Field Communication, etc.), drive mechanism sensors (e.g., encoders, cameras, time-of-flight sensors, voltage/current sensors, accelerometers, force sensors, contact sensors, etc.; inboard and/or outboard ends, such as encoders at both the actuator and the wheel), wheel encoders, deployment mechanism sensors (e.g., position sensing, spring feedback sensing, spring force sensors, etc.), payload sensors (e.g., force sensors/switches, cameras, proximity sensors, payload envelope sensors, payload engagement sensors, etc.), perception suite sensors (e.g., cameras, time-of-flight sensors, proximity sensors, radar, Lidar, etc.; support frame sensors, etc.), integrated actuator sensors, and/or any other suitable set of sensors. The sensors can include one or more: Radar sensors, LIDAR sensors, cameras, camera arrays, time-of-flight sensors, time-of-flight arrays, spatial sensors, location sensors, force sensors, on-board diagnostic sensors (such as vehicle mechanism sensors), audio sensors, barometers, light sensors, temperature sensors, current sensors, voltmeters, contact sensors, proximity sensors, vibration sensors, ultrasound sensors, electrical sensors, pressure sensors, and/or any other suitable sensors. However, the robot can include any other suitable sensors.

In variants, one or more sensors of the sensor suite and/or perception suite thereof can be arranged on each end/corner of the robot (e.g., front, back, left, right; top and bottom; along diagonals, etc.) and/or oriented along each actuation axis of the vehicle.

In variants, the sensor suite can include a set of helical drive sensors (e.g., arranged at an outboard/actuated drive end of the arm actuation mechanism) at each helical drive mechanism. For example, the helical drive sensors can include: contact sensors (e.g., which physically contact the rack structure) and/or non-contact sensors (e.g., cameras, light sensors, optical sensors, laser imaging sensors, time-of-flight sensors, etc.) configured to facilitate alignment and/or engagement of the helical drive mechanism with the frame structure (e.g., helical drive interface). Sensors can be used to provide feedback on (and/or estimate) the arm position and/or geometric center of the robot. Additionally, sensors can provide sensing of coordinate position (e.g., position along the vertical axis; or higher order derivatives thereof: velocity, acceleration, jerk, etc.), incline angle (e.g., pitch, roll, etc.), and/or any other suitable parameters. In variants, sensors can be indexed/referenced relative to coordinate frames and/or geometric features/datums as defined by the grid (e.g., base plane at a superior surface of a beam; hole pattern or indices along the column, etc.).

The sensor suite can facilitate odometry and/or localization relative to frame features (e.g., cells and/or coordinate positions therein; helical rack geometry and/or mounting hole pattern; fiducials; etc.), dead reckoning, and/or can otherwise facilitate localization within the frame structure and/or along a vertical axis or vertical cell array thereof. The sensors are preferably communicatively coupled to the computing system to facilitate perception and/or control. For instance, the sensor suite can be configured to collect data at various frequencies and/or resolutions, depending on the specific requirements of the operating environment. The collected data can be processed and analyzed in real-time (or near real time) to inform the autonomous decision-making and control at the computing system.

However, the system can include any other suitable sensor suite and/or any other suitable sensor(s).

The system can include or be used in conjunction with a computing system, which can include a central computer and/or a plurality of actuator controllers. The computing system and/or various computing operations thereof can be centralized, distributed (e.g., modularized), local/onboard, remote and/or otherwise implemented. The computing system preferably controls actuation based on sensor feedback (e.g., CAN/LIN network communications) and/or facilitate I/O communication (e.g., with a remote server, remote/centralized planner, cloud computing resources, external data storage, HMI control system, etc.). The computing system and/or the controller(s) thereof can include: one or more: CPUs, GPUs, custom FPGA/ASICS, microprocessors, servers, cloud computing, and/or any other suitable components. The controllers and/or elements of the computing system can be communicatively coupled in series, parallel, and/or any combination thereof (e.g., parallel/star configuration). However, the computing system can be otherwise configured.

The computing system can receive sensory inputs/measurements from the sensor suite, which can be used to determine a vehicle state and dynamically control the robot 600 based on the vehicle state. For example, the computing system can control deployment mechanisms to effect system configuration change(s) and/or control the drive system(s) based on the vehicle state.

In variants, the computing system is preferably an autonomous computing system which facilitates navigation along a trajectory received (wirelessly) from a remote computing system (e.g., a remote planner, tele-operator, etc.). For example, the computing system can be configured to autonomously navigate along a target (vertical) velocity profile or path. Additionally or alternatively, the computing system can function to implement external navigation commands, teleoperation commands (e.g., received from a remote tele-operator), autonomous collision avoidance/control, and/or any other system controls. The computing system can include a battery management system (BMS), actuator controllers (e.g., motor inverter, hydraulic/pneumatic controllers, etc.), and/or any other suitable components. The computing system is preferably onboard the chassis (e.g., mounted to the chassis, etc.), but can additionally or alternatively include one or more remote computing elements and/or distributed/cloud processing elements. The computing system can be centralized (e.g., packaged within a single module), distributed (e.g., across multiple compute nodes, packaged within multiple compute modules, etc.), and/or can be otherwise configured. However, the system can include or be used with any other suitable computing system(s).

The system can optionally include or be used with a support tray (a.k.a., platform), which functions to support a payload (e.g., cargo container) within the storage grid 200. The support tray is preferably passively actuated (e.g., no onboard controller system(s) and/or actuators; engaged and/or actuated by a deployment mechanism of the robot), but can additionally or alternatively be actively controllable (e.g., onboard deployment mechanisms), separately actuated (e.g., externally), substantially rigid, and/or can be otherwise configured. As an example, one or more engagement features at a superior surface of the system can mechanically couple the system to a support tray and/or facilitate deployment of the support tray (e.g., via an onboard deployment mechanism).

However, the robot can include any other suitable components.

The robot can include and/or interface with the a storage grid 200, can support the robot, and may define and enable its movement in multiple directions.

Each robot is preferably able to move in 3 dimensions (e.g., x-, y-, and z-directions) throughout the storage structure. Additionally or alternatively, the storage structure can enable other movement, limit (e.g., selectively limit) certain movements, and/or otherwise facilitate storage and/or transit of materials.

The storage structure preferably defines a frame, such as through the construction and attachment of multiple cells, where the robot can move horizontally between cells through the deployment and retraction of sets of wheels.

Figure 14:
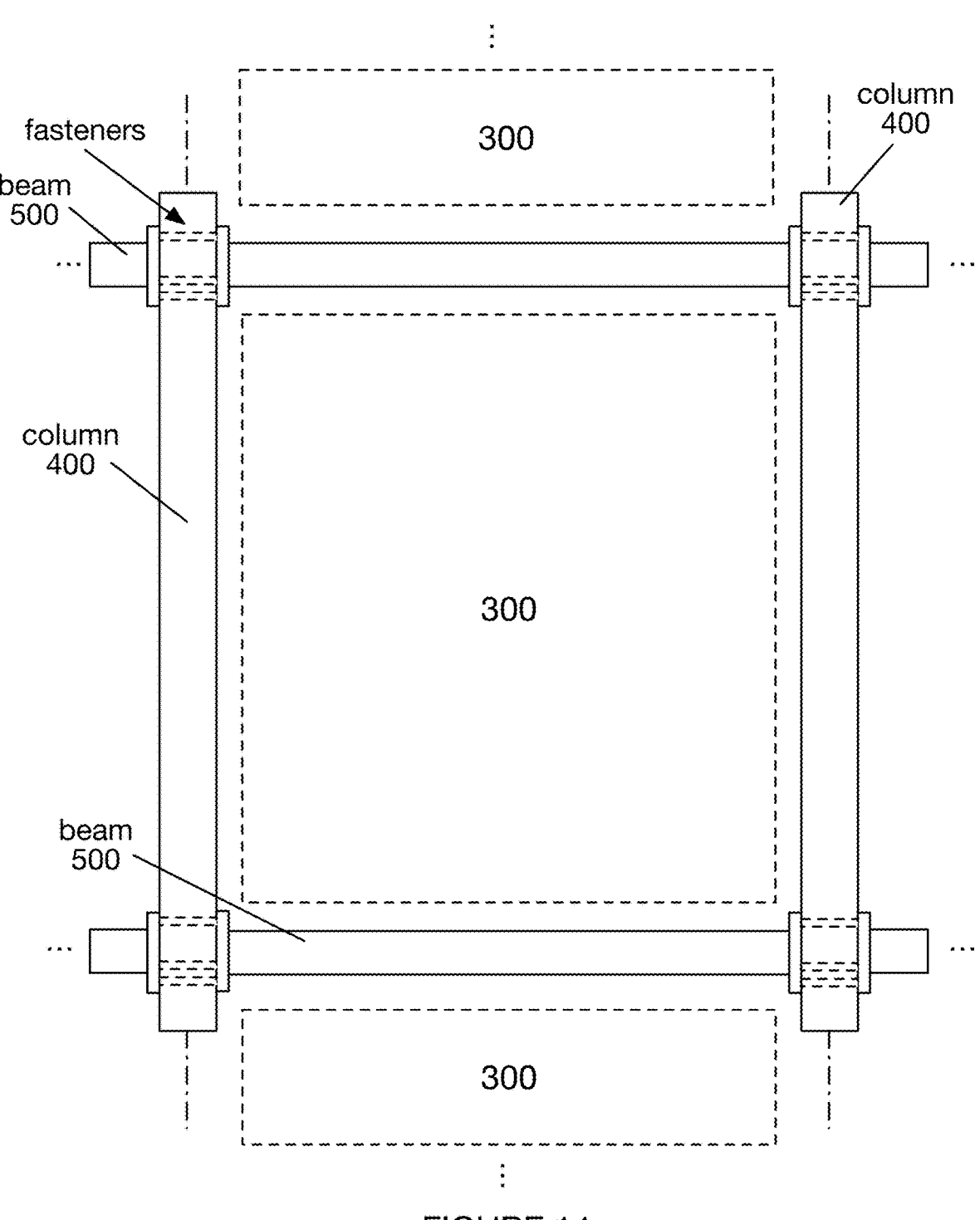
FIG. 14 is a side view schematic representation of a variant of the system.
Figures 15, 16:
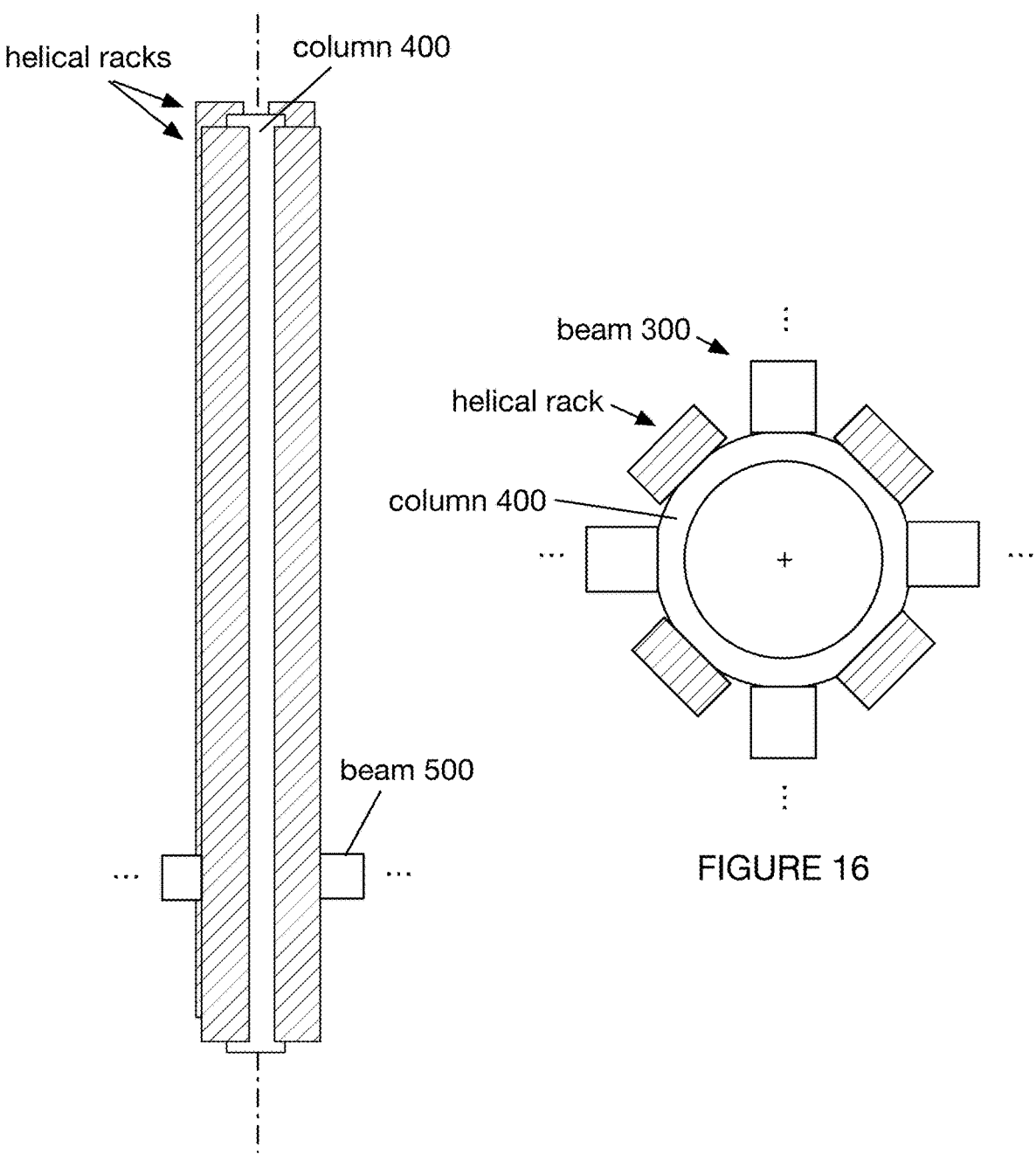
FIG. 15 is a schematic representation of a variant of the system illustrating column with helical racks.
FIG. 16 is an example top view cross section representation of a variant of the system.
Figure 17:
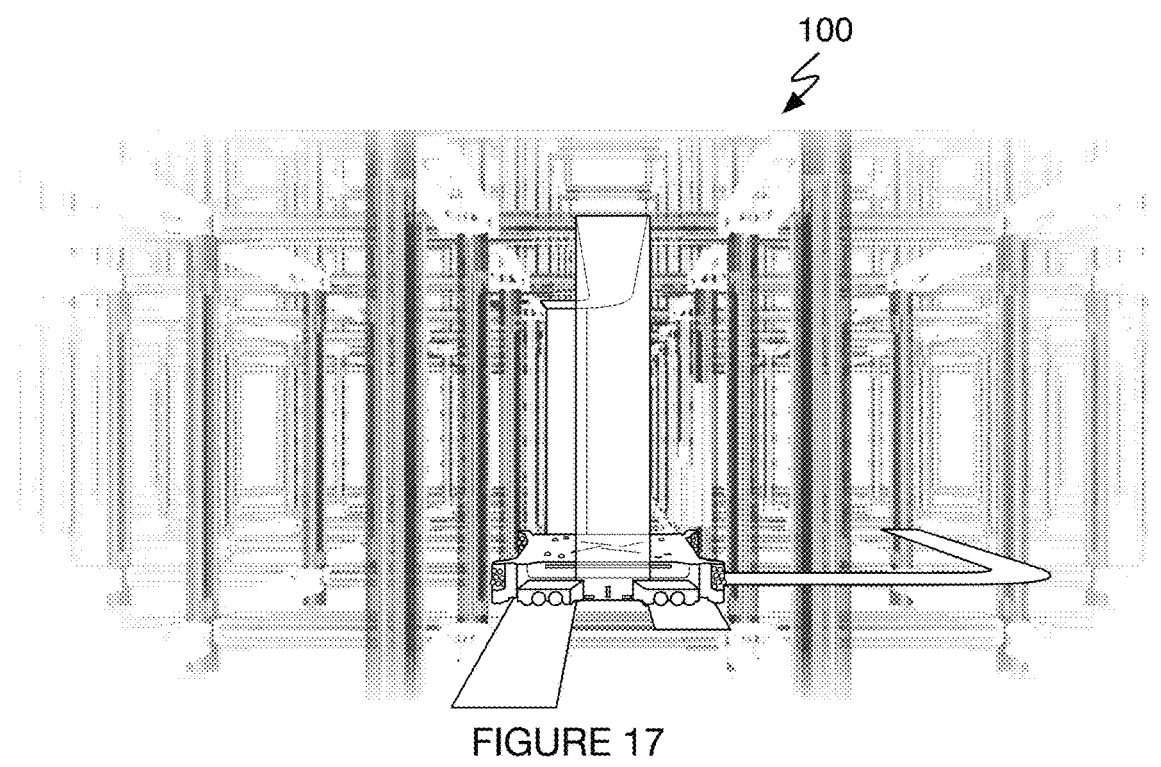
FIG. 17 is an illustrative representation of a variant of system.
Figure 18:
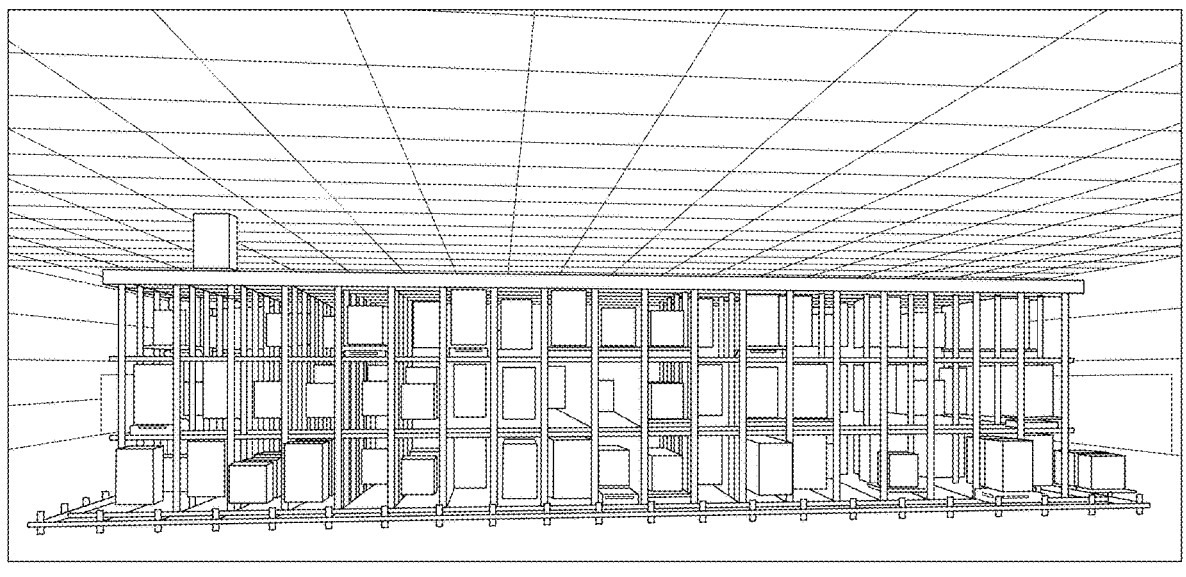
FIG. 18 is an illustrative representation of a variant of system.

Additionally, the storage structure further preferably defines helical racks along columns of the frame (e.g., as shown in FIGS. 14 and 15), where the helical racks enable vertical translation of the robot(s) and can additionally function to: prevent slippage of the robot relative to the helical rack; promote smooth translation of the robot; and/or perform any other functions. In some variants, the helical racks define varying circumferential angles (equivalently referred to herein as circumferential span) along their lengths. For example, the helical racks can have a smallest circumferential span at the end where the robot enters the helical rack (which enables the arms of the robot to enter and engage with the helical rack), where the circumferential span increases (e.g., gradually, in a stepped fashion, etc.) along its length, which functions to contain the robot once it is engaged.

Different processes and/or elements discussed above can be performed and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the invention without departing from the scope of this invention defined in the following claims.

We claim:

1. An automated storage and retrieval system (AS/RS) comprising:
   a first column comprising a rolled tube;
   four helical racks mounted to the first column, the four helical racks radially symmetric about a vertical axis of the first column; and
   a set of beams comprising:
      a first and second pair of beams mounted to the first column, a first plane orthogonal to the vertical axis and intersecting the first and second pairs of beams; and
      a third and fourth pair of beams mounted to the first column, a second plane orthogonal to the vertical axis and intersecting the third and fourth pairs of beams,
   wherein the first and second planes intersect each of the four helical racks,
   wherein the set of beams joins the first column to a first, second, third, and fourth column within a portal frame,
   wherein the portal frame defines a first, second, third, and fourth cell between the first plane and the second planes,
   wherein an AS/RS shuttle is configurable to traverse along a path, between the first, second, third, and fourth cells, which encircles the first column.

2. The system of claim 1, wherein the portal frame defines a fifth and a sixth cell below the first and second cells, respectively, wherein the AS/RS shuttle is further configurable to traverse along a path, between the first, second, sixth, and fifth cells, which encircles a beam of the first pair.

3. The system of claim 1, wherein the portal frame defines an annular clearance region which encircles the first column between the first and second planes.

4. The system of claim 3, wherein the system further comprises a set of diagonal braces which extend between the first and second planes, wherein the set of diagonal braces do not intersect the annular clearance region.

* * * * *